(12) United States Patent
Hijikata et al.

(10) Patent No.: US 7,228,212 B2
(45) Date of Patent: Jun. 5, 2007

(54) DRIVING INFORMATION SYSTEM WITH HAPTIC NOTIFICATION SEAT

(75) Inventors: Shunsuke Hijikata, Kamakura (JP); Masahiro Egami, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 158 days.

(21) Appl. No.: 11/052,812

(22) Filed: Feb. 9, 2005

(65) Prior Publication Data

US 2005/0187684 A1    Aug. 25, 2005

(30) Foreign Application Priority Data

Feb. 9, 2004    (JP)    ............................ P2004-032466

(51) Int. Cl.
| | |
|---|---|
| B60N 2/44 | (2006.01) |
| G08G 1/16 | (2006.01) |
| B60R 21/00 | (2006.01) |
| G06F 17/00 | (2006.01) |

(52) U.S. Cl. ....................... 701/45; 340/438

(58) Field of Classification Search ................ None
See application file for complete search history.

(56) References Cited

U.S. PATENT DOCUMENTS

| | | | |
|---|---|---|---|
| 5,699,057 A * | 12/1997 | Ikeda et al. ................. | 340/937 |
| 5,835,028 A * | 11/1998 | Bender et al. .............. | 340/937 |
| 2002/0184236 A1* | 12/2002 | Donath et al. ........... | 707/104.1 |
| 2003/0060936 A1 | 3/2003 | Yamamura et al. | |
| 2003/0229447 A1* | 12/2003 | Wheatley et al. ........... | 701/300 |
| 2004/0049323 A1* | 3/2004 | Tierina et al. ................ | 701/1 |
| 2004/0225424 A1 | 11/2004 | Yamamura et al. | |

FOREIGN PATENT DOCUMENTS

| | | | |
|---|---|---|---|
| EP | 1235052 A1 * | 8/2002 | |
| JP | 5-126948 | 5/1993 | |
| JP | 2000-225877 | 8/2000 | |
| JP | 2001-341599 | 12/2001 | |

* cited by examiner

*Primary Examiner*—Michael J. Zanelli
(74) *Attorney, Agent, or Firm*—McDermott Will & Emery LLP

(57) ABSTRACT

A driving information system that conveys driving condition information to a driver of a vehicle via a haptic notification seat. A signal representing a driving condition, such as a lateral position of the vehicle, is generated. Two haptic signals are provided and regulated in specific ways to provide the driving condition to the driver: a first haptic input to the driver from a first portion of the seat, and a second haptic input to the driver from a second portion of the seat.

22 Claims, 21 Drawing Sheets

DRIVING INFORMATION SYSTEM WITH HAPTIC NOTIFICATION SEAT

RELATED APPLICATIONS

The present application claims the benefit of priority from Japanese Patent Application No. 2004-032466, filed Feb. 9, 2004, the disclosure of which is hereby incorporated by reference in its entirety.

The present application has a related U.S. patent application Ser. No. 11/047,577, entitled "DRIVING ASSISTANCE METHOD AND SYSTEM WITH HAPTIC NOTIFICATION SEAT," filed Feb. 2, 2005, and commonly assigned to the assignee of the present application, the disclosure of which is incorporated herein by reference in its entirety.

1. Field of the Disclosure

The present disclosure relates to a system and method for conveying information related to driving conditions via a haptic notification seat.

2. Description of Related Art

JP-A 2000-225877 discloses a system for assisting a driver occupying a seat within a vehicle traveling on a road. The seat has a vibrator. This vibrator is activated upon detecting an obstacle within a rear region of the vehicle. Via vibration, the driver within the seat can be informed of the fact that the obstacle is approaching. This system, however, does not provide the driver with information related to a lateral position of the vehicle with respect to a lane on the road.

Therefore, a need remains for a method and system for providing a driver with information related to a lateral position of a vehicle with respect to a lane on a road.

SUMMARY OF THE DISCLOSURE

The present disclosure describes a method and system for providing driving information to a driver via a haptic notification seat of a vehicle. An exemplary system includes a sensor for sensing a driving condition, and a controlling device configured to regulate at least one of a first haptic signal applied to the driver from a first portion of the seat and a second haptic signal applied to the driver from the second portion of the seat, based on the driving condition. Responsive to the driving condition representing that the vehicle is traveling about a determined centerline of a lane on which the vehicle is being driven, the first haptic signal and the second haptic signal are substantially equal. According to one embodiment, the first portion of the seat corresponds to a first boundary of the lane, and the second portion of the seat corresponds to a second boundary of the lane.

The first haptic signal and the second haptic signal may be regulated in numerous ways to provide sufficient information related to the detected driving condition. In one aspect, responsive to the driving condition representing that the vehicle is deviating from the determined centerline, the controlling device is configured to regulate at least one of the first haptic signal and the second haptic signal such that a difference between the first haptic signal and the second haptic signal exceeds a predetermined range. In another aspect, responsive to the driving condition representing that the vehicle is deviating from the centerline towards one of a first boundary and a second boundary of the lane, the controlling device varies the corresponding one of the first haptic signal and the second haptic signal, in which the selected haptic signal is varied at more than one rate with respect to a lateral position of the vehicle relative to the determined centerline.

According to still other embodiments, responsive to the driving condition representing that the vehicle deviates from the centerline towards the first boundary beyond a predetermined range, the controlling device may cause the second haptic signal to assume the minimum value, cause the first haptic signal to assume the maximum value, set a change rate of the first haptic signal to assume the maximum value, set a change rate of the second haptic signal to assume the minimum value, decrease the first haptic signal and/or increase the second haptic signal.

According to another embodiment, responsive to the driving condition representing that the vehicle has changed to a new lane, the controlling device controls the first haptic signal and the second haptic signal to gradually assume values corresponding to the new lane.

Another exemplary system of this disclosure regulates a haptic signal provided from the seat in response to an event representing that the vehicle is crossing or has crossed a lane boundary into a new lane. The System includes a controlling device configured to determine that the vehicle is being driven on a first lane, and an event that the vehicle is crossing or has crossed a lane boundary between the first lane and a second lane next to the first lane, based on an obtained driving condition. Responsive to the event, the controlling device determines a positional relationship of the vehicle relative to the second lane, and provides a haptic signal to the driver from the seat based on the positional relationship of the vehicle relative to the second lane. In one aspect, the haptic signal includes a first haptic signal to the driver from a first portion of the seat and a second haptic signal to the driver from a second portion of the seat. The first haptic signal and the second haptic signal are equal immediately before the vehicle is crossing the lane boundary between the first lane and the second lane. According to another embodiment, the controlling device is further configured to determine a centerline of the first lane and a position of the vehicle relative to the centerline of the first lane. Responsive to the position of the vehicle deviating from the centerline of the first lane, the controlling device regulates the first haptic signal and the second haptic signal such that a difference between the first haptic signal and the second haptic signal exceeds a predetermined value. The controlling device may be configured to determine a centerline of the second lane and the position of the vehicle relative to the centerline of the second lane, and regulates the first haptic signal and the second haptic signal based on the position of the vehicle relative to the centerline of the second lane.

Additional objects, advantages and novel features of the examples will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The figures depict one or more implementations in accord with the present concepts, by way of example only, not by way of limitations. In the figures, like reference numerals refer to the same or similar elements.

DETAILED DESCRIPTION OF THE DISCLOSURE

First Exemplary Embodiment

Figure 1:
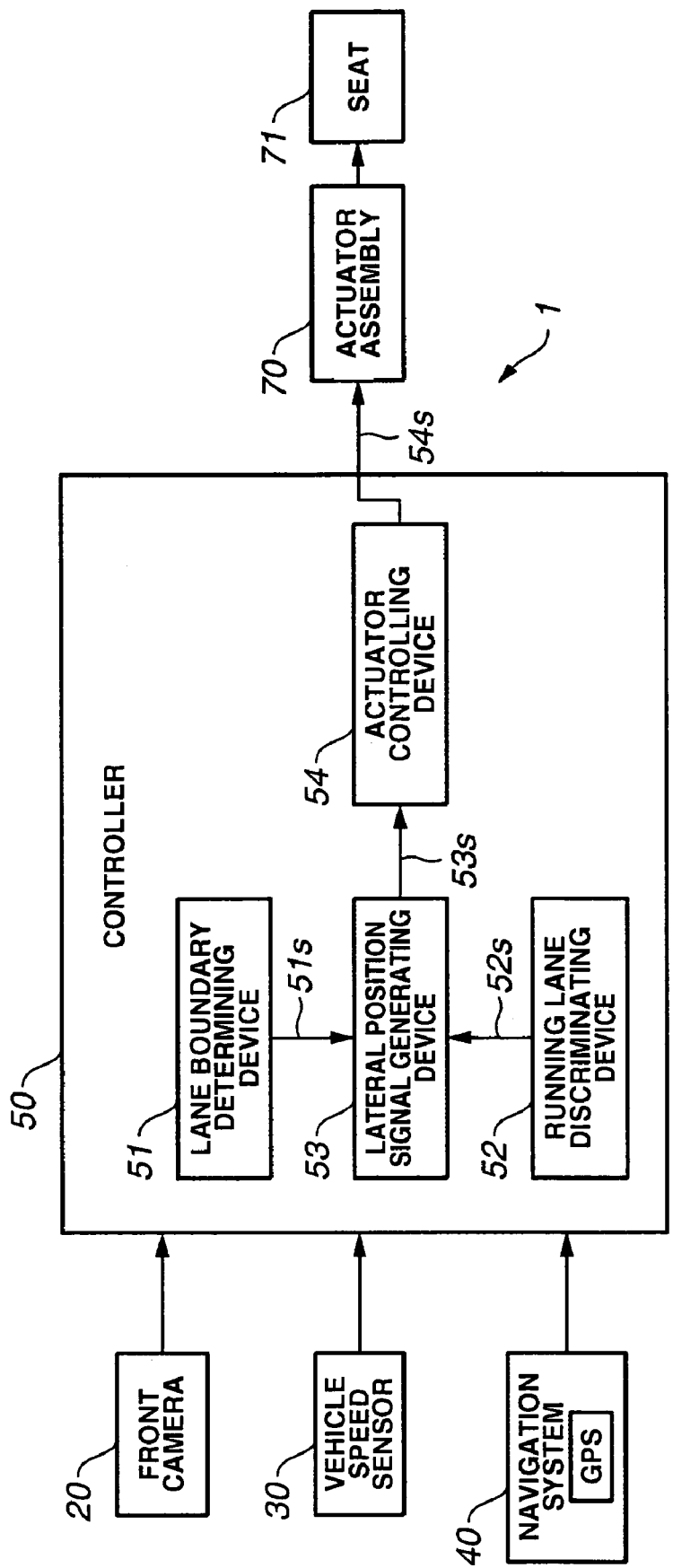
FIG. 1 is a block diagram of an exemplary system according to the present disclosure.

FIG. 1 shows an exemplary driving information system 1 according to this disclosure. System 1 includes a lateral position generating device 53, an actuator assembly 70 coupled to a seat 71 within a vehicle 100 (see FIG. 2), and an actuator controlling device 54. The lateral position signal generating device 53 generates a lateral position signal 53s. The lateral position signal 53s indicates a lateral positional relationship of vehicle 100 with respect to a lane on a road. The actuator controlling device 54 receives the lateral position signal 53s and provides an output signal 54s to the actuator assembly 70.

Figure 3A:
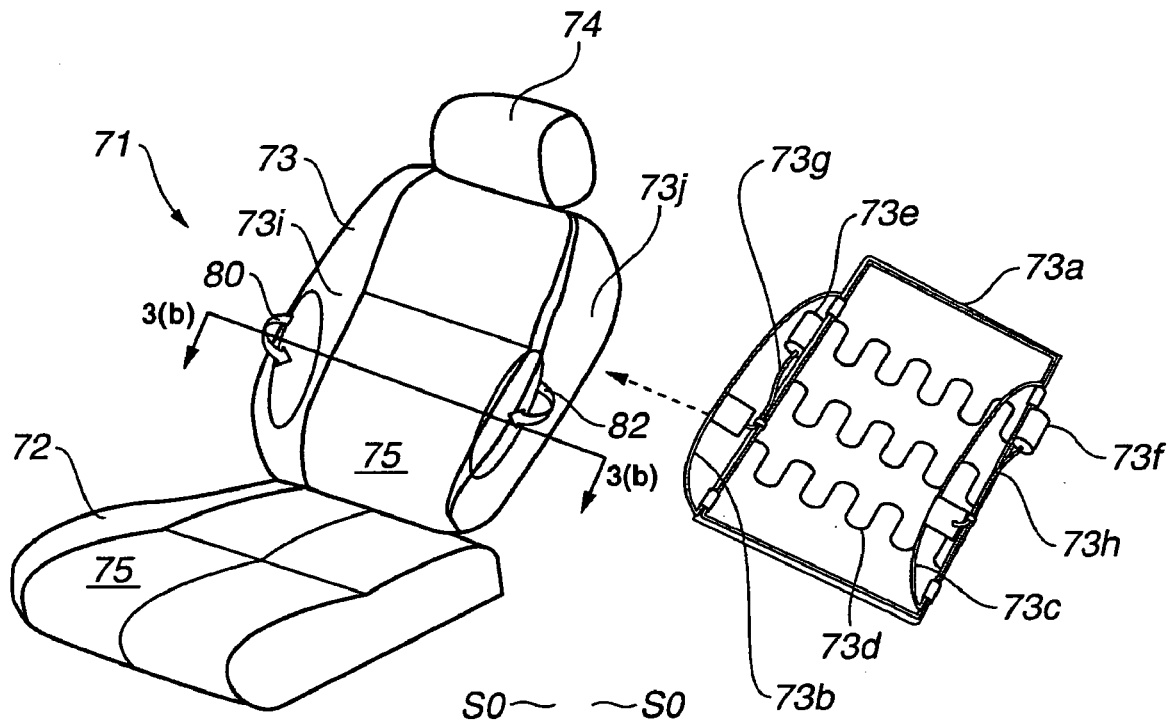
FIG. 3(a) is an exploded view of the seat occupied by the driver.
Figure 3B:
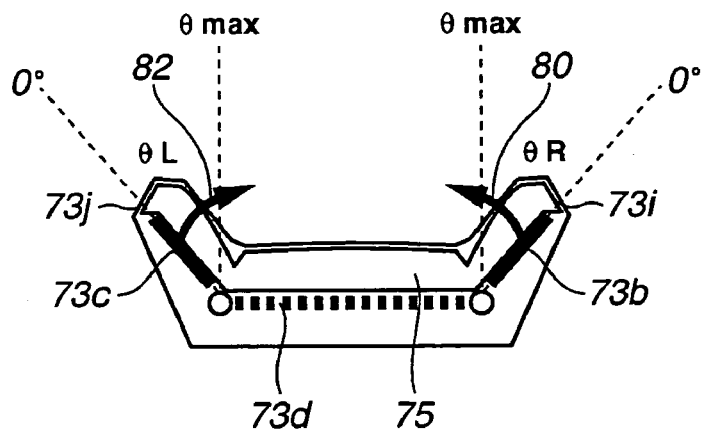
FIG. 3(b) is a section taken through the line 3(b)-3(b) in FIG. 3(a).

With reference also to FIGS. 3(a) and 3(b), as discussion proceeds, it will be understood that the actuator controlling device 54 causes the actuator assembly 70 to produce a first haptic input to the driver from a first or right side portion 73i of the seat 71, and a second haptic input to the driver from a second or left side portion 73j, such as the opposite to the first side portion of the seat 71.

Figure 4A:
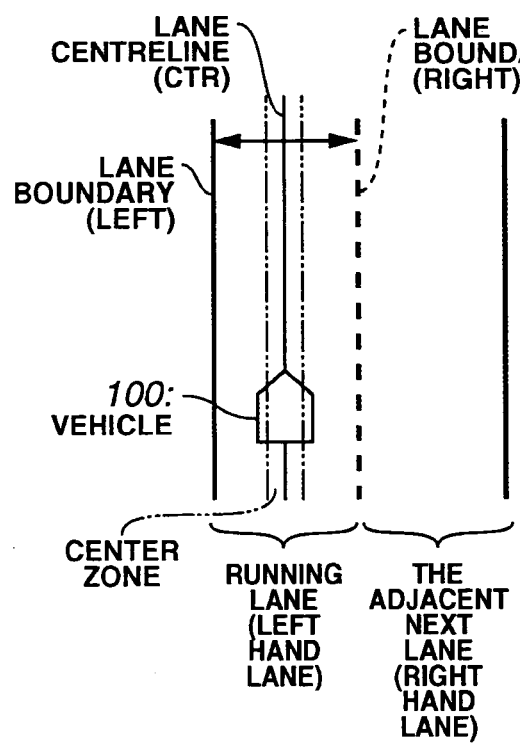
FIG. 4(a) is a state diagram of the vehicle traveling on a road with its reference point within a center zone of the lane about a determined lane centerline between lane boundaries.

With reference to FIG. 4(a), when the lateral position signal 53s indicates that a reference point of the vehicle 100, such as a nose of the vehicle or a center of the vehicle, is within a center zone (as indicated by an area between two imaginary lines shown in two-dot chain lines) on the road about a determined lane centerline between the left and right lane boundaries, the actuator controlling device 54 causes the actuator assembly 70 to regulate the first and second haptic inputs in such a manner that a difference between the first and second haptic inputs falls in a predetermined limited range in the neighborhood of zero.

Figure 4B:
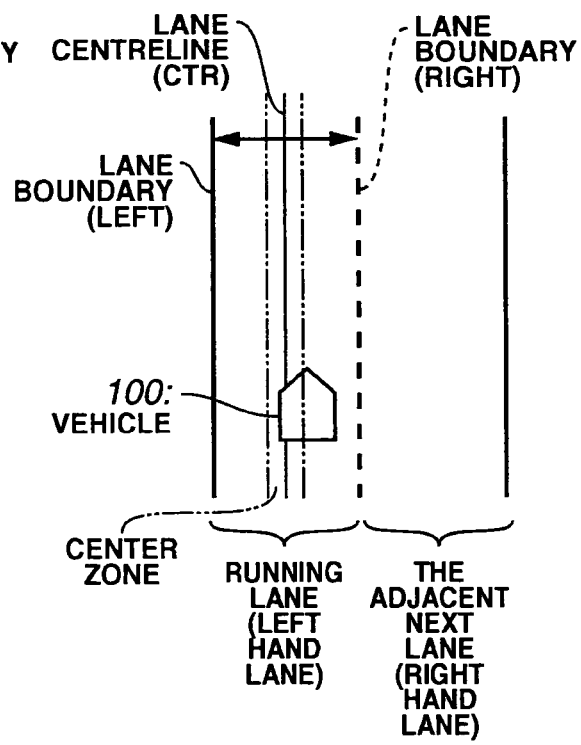
FIG. 4(b) is a state diagram of a vehicle traveling on the road with its reference point deviating from the center zone towards one of the lane boundaries.

With reference to FIG. 4(b), when the lateral position signal 53s indicates that the reference point of the vehicle 100 is deviating from the center zone towards the first or right lane boundary, the actuator controlling device 54 causes the actuator assembly 70 to increase the first haptic input and decrease the second haptic input in such a manner that the difference between the first and second haptic inputs falls outside of the predetermined limited range.

When the lateral position signal 53s indicates that the reference point of the vehicle is deviating from the center zone towards the second or left lane boundary, the actuator controlling device 54 causes the actuator assembly 70 to decrease the first haptic input and increase the second haptic input in such a manner that the difference between the first and second haptic inputs falls outside of the predetermined limited range.

Techniques to vary the first and second haptic inputs corresponding to different values in lateral distance of the reference point of the vehicle 100 relative to the determined lane centerline of the lane are described later in connection with FIGS. 7, 8, 11 to 18, 21 to 24, 25(a) and 25(b). In each of these figures, the solid line indicates the first haptic input, while the one-dot chain line illustrates the second haptic input. As is readily seen from at least some of these figures, when the lateral position signal 53s indicates that the reference point of the vehicle 100 is deviating from the center zone towards one of the right and left lane boundaries, the actuator controlling device 54 causes the actuator assembly 70 to vary the first and second haptic inputs in such a manner that the difference between the first and second haptic inputs has varying values, falling outside of the predetermined limited range, corresponding to different positions that the reference point of the vehicle relative to the center zone and the lane boundary.

Figure 2:
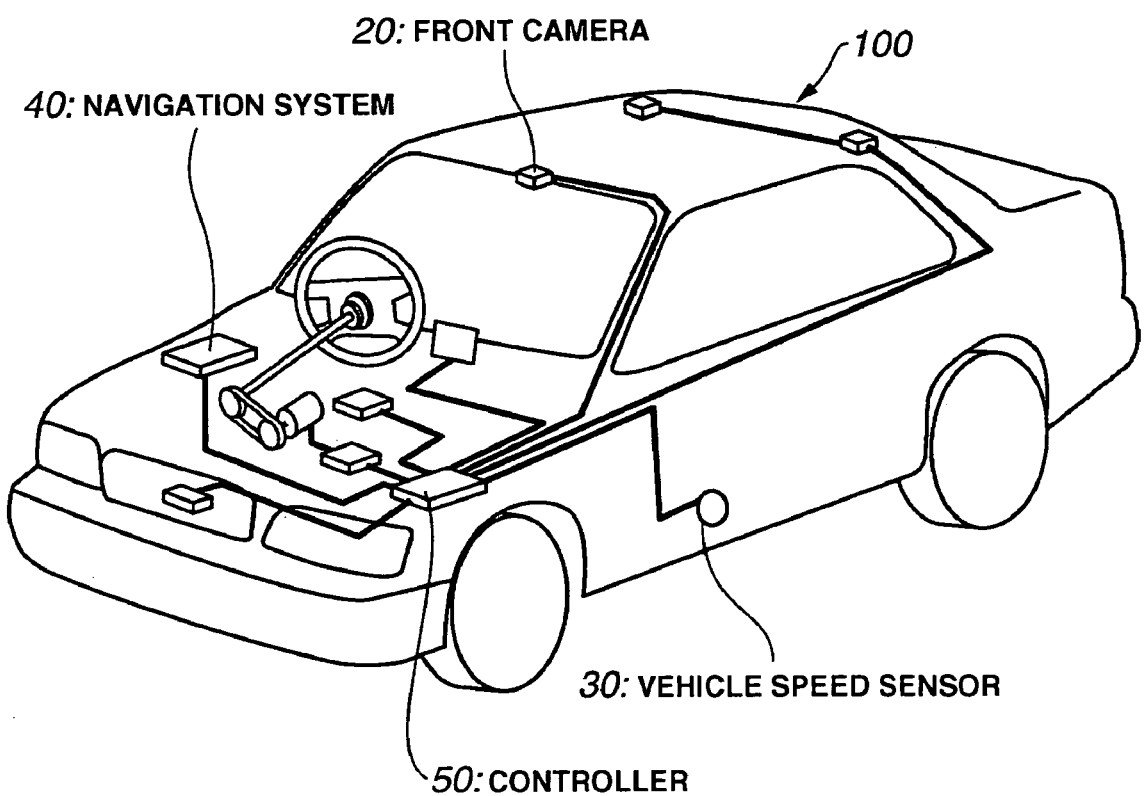
FIG. 2 is an automobile installed with a system according to this disclosure.

Referring to FIGS. 1 and 2, system 1 includes a front camera 20, a vehicle speed sensor 30, a navigation system 40, and a controller 50.

The front camera 20 is of the CCD type or CMOS type. The front camera 20 may be mounted to the vehicle 100 in the vicinity of an internal rear view mirror to pick up an image of a road ahead of the vehicle 100. The front camera 20 provides the image to the controller 50. The region covered by the front camera 20 extends from the camera axis to each side by 30 degrees. The controller 50 processes the image of the road ahead of the vehicle 100.

The vehicle speed sensor 30 may determine a vehicle speed of the vehicle 100 by processing outputs from wheel speed sensors. The vehicle speed sensor 30 may include an engine controller or a transmission controller, which can provide a signal indicative of the vehicle speed. The vehicle speed sensor 30 provides an output signal indicative of a vehicle speed of the vehicle 100 to the controller 50 for determining lane boundaries of the lane on which the vehicle 100 is running.

The navigation system 40 includes a GPS receiver and provides an output signal indicative of information regarding where the vehicle 100 is traveling to the controller 50. The controller 50 processes the output signal from the navigation system 40 for discriminating on which one of lanes the vehicle 100 is running.

The controller 50 may comprises a microprocessor including a central processing unit (CPU), and a computer readable storage medium, which includes, for example, a read only memory (ROM), and a random access memory (RAM). In the illustrated example, the controller 50 includes software implementations of a lane boundary determining (LBD) device 51, a running lane discriminating (RLD) device 52, the before-mentioned lateral position signal generating (LPSG) device 53, and the before-mentioned actuator controlling (AC) device 54.

The LBD device 51 processes the image ahead of the vehicle 100 provided by the front camera 20 to determine lane boundaries by detecting lane markers or markings defining the lane boundaries. The lane boundaries as used herein may include lane dividers, lane marks, lines, lane stripes, median strips, reflective studs or poles, bots dots, curbs, walls, concrete slabs, jersey barriers and/or guard rails. The LBD device 51 provides an output signal 51s indicative of the determined boundaries to the LPSG device 53.

The RLD device 52 receives the output signal of the navigation system 40 and discriminates a lane on which the vehicle is running, namely, "a running lane", out of available lanes on the road. The RLD device 52 provides an output signal 52s indicative of the discriminated running lane to the LPSG device 53.

The LPSG device 53 determines a determined lane centerline between the lane boundaries of the running lane by calculating a location of an intermediate point between the lane boundaries. In this example, the intermediate point is a middle point equidistant from each of the lane boundary. If desired, the intermediate point may be deviated from the middle point towards appropriate one of lane boundaries of a running lane. The term "determined lane centerline" as used herein means an imaginary reference line interconnecting the intermediate points, which are equidistant from each of the lane boundaries or slightly deviated from the middle point. The LPSG device 53 calculates or measures a lateral distance of the reference point of the vehicle 100 from the determined centerline within the running lane and determines whether or not this lateral position indicates that the reference point of the vehicle 100 falls in a lane width, W, of the running lane. Only if this is the case, the LPSG device 53 generates the lateral position signal 53s indicative of the calculated lateral position, X. Thus, the lateral position signal 53s indicates the lateral positional relationship of the vehicle 100 with respect to the running lane. The LPSG device 54 provides the lateral position signal 53s to the AC device 54.

The AC device 54 evaluates the lateral position signal 53s and determines, in response to the lateral position, X, an angular position $\theta R$ for the right side portion 73i of the seat 71 and an angular position $\theta L$ for the left side portion 73j of the seat 71. The AC device 54 converts the determined angular positions $\theta R$ and $\theta L$ to angles through which motors 73e and 73f (see FIG. 3(a)) of the actuator assembly 70 need to turn to cause the right and left side portions 73i and 73j of the seat 71 to achieve the determined angular positions $\theta R$ and $\theta L$. The AC device 54 provides output signals 54s indicative of the angles for the motors 73e and 73f to the actuator assembly 70.

The actuator assembly 70 receives the output signals 54s and modifies contour of the seat 71 to produce the first haptic input to the driver from the right side portion 73i, and the second haptic input to the driver from the left side portion 73j. In the embodiment, the first and second haptic inputs are in the form of forces applied to the driver from the right and left side portions 73i and 73j of the seat 71.

For understanding property of the first and second haptic inputs to the driver, the following several sections provide description on the seat 71 within the vehicle 100.

With reference now to FIGS. 3(a) and 3(b), the seat 71 includes a cushion 72, a back rest 73 and a head rest 74. The cushion 72 and back rest 73 include pads 75. In the embodiment, the right and left side portions 73i and 73j are integral portions of the back rest 73.

The back rest 73 includes a seat back frame 73a, a right side frame 73b and a left side frame 73c. The pads 75 cover these frames 73a, 73b, and 73c. The seat back frame 73a has springs 73d attached thereto to support the pad 75.

The right and left side portions 73i and 73j include the right and left side frames 73b and 73c, respectively. The right side frame 73b is movingly connected to the seat back frame 73a at a right side thereof for angular rotational movement as indicated by an arrow 80. The left side frame 73c is movingly connected to the seat back frame at a left side thereof for angular rotational movement as indicated by an arrow 82.

In order to control angular positions of the right and left side frames 73b and 73c, the actuator assembly 70 includes motor units 73e and 73f. As shown in FIG. 3(a), the motor units 73e and 73f are attached to portions of the seat back frame 73a near the right and left sides, respectively. Output torque of the motor unit 73e is transmitted by a torque cable 73g to the right side frame 73b, thereby to rotate the right side frame 73b. Output torque of the motor unit 73f is transmitted by a torque cable 73h to the left side frame 73c, thereby to rotate the left side frame 73c.

FIG. 3(b) illustrates rest or 0° positions of the right and left side frames 73b and 73c when the determined angular positions θR and θL by the AC device 54 (see FIG. 1) are 0°. The right and left side frames are continuously settable to any angular positions between 0° and the maximum degree θmax. In the embodiment, the right side frame 73b can be rotated counterclockwise, as shown in FIG. 3(b), to a generally upright limit position, with respect to an imaginary plane of the seat back frame 73a, when the determined angular position θR is the maximum degree θmax. The left side frame 73c can be rotated clockwise, as shown in FIG. 3(b), to a generally upright limit position, with respect to the imaginary plane of the seat back frame 73a, when the determined angular position θL is the maximum degree θmax.

The actuator assembly 70 operates in response to the output signals 54s provided by the controller 50, and controls rotation directions of each of the motor units 73e and 73f.

Rotation, in one direction, of the motor unit 73e causes the right side frame 73b to rotate in the same direction to press the right side portion 73i firmly against a right-hand side of the driver. Subsequently, rotation, in the opposite direction, of the motor unit 73e causes the right side frame 73b to rotate in the same opposite direction to move the right side portion 73i away from the right-hand side of the driver, to eliminate or at least decrease pressure applied to the right-hand side of the driver. Rotation, in one direction, of the motor unit 73f causes the left side frame 73c to rotate in the same direction to press the left side portion 73j firmly against a left-hand side of the driver. Subsequently, rotation, in the opposite direction, of the motor unit 73f causes the left side frame 73c to rotate in the same opposite direction to move the left side portion 73j away from the left-hand side of the driver, to eliminate or at least decrease pressure applied to the left-hand side of the driver.

From the preceding descriptions, it is understood that, in the embodiment, the first haptic input is in the form of pressure applied to the right-hand side of the driver from the right side portion 73i, and the second haptic input is in the form of pressure applied to the left-hand side of the driver from the left side portion 73j.

The embodiment may be further understood from the descriptions below.

FIG. 4(a) illustrates a state of the vehicle 100 traveling on a center zone about a determined centerline within the left lane. The seat 71 forwards to the driver information regarding the state of the vehicle 100 traveling on the center zone by applying the same pressure to right-hand and left-hand sides of the driver from the right and left side portions 73i and 73j.

FIG. 4(b) illustrates a state of the vehicle 100 traveling on the left lane in close proximity to a lane boundary on the right. The seat 71 forwards to the driver information regarding the state of the vehicle in relation to the lane boundary by moving the right and left side portions 73i and 73j in an independent manner. For example, in the state illustrated by FIG. 4(b), increasing pressure input from the right side portion 73i and decreasing pressure input from the left side portion 73j transmit to the driver information that the vehicle 100 lies in close proximity to the lane boundary on the right. Increasing pressure input from the side portion in close proximity to a lane boundary and decreasing pressure input from the side portion remote from the lane boundary effectively transmit to the driver information regarding the lateral position of the vehicle in relation to the lane boundary.

Figure 5:
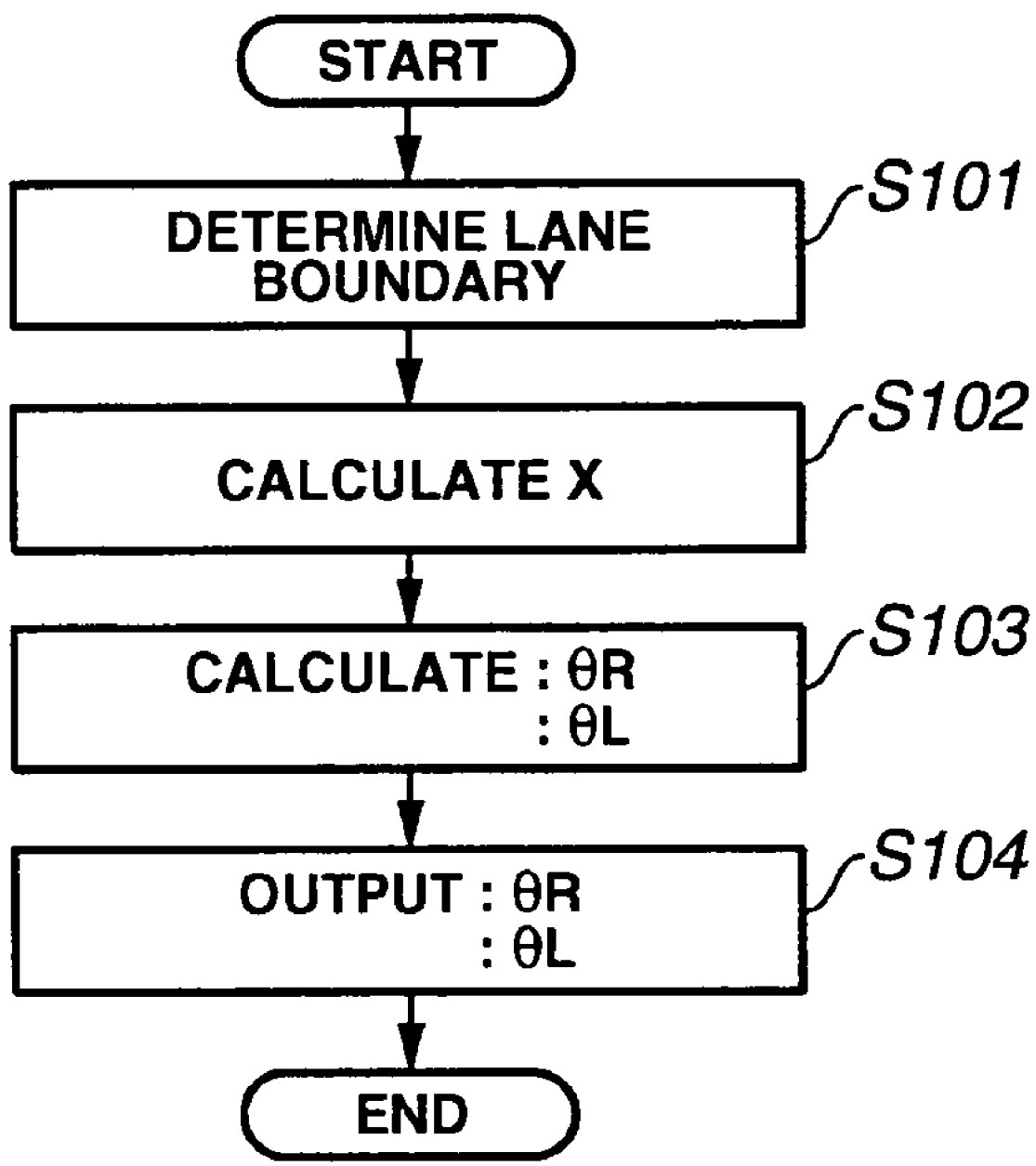
FIG. 5 is an exemplary flow chart for determining and providing an output to an actuator assembly coupled to the seat.

The flow chart in FIG. 5 illustrates operation of the embodiment. Execution of the flow chart is repeated at regular interval of 50 milliseconds.

In FIG. 5, at step S101, lane boundaries of a lane on which a vehicle is traveling are determined. Based on an output signal of the navigation system 40, a lane on which the vehicle is traveling is determined. Then, lane markings defining lane boundaries of the lane are recognized by processing a picture image, picked up by the front camera 20, of a road ahead of the vehicle.

Figure 6:
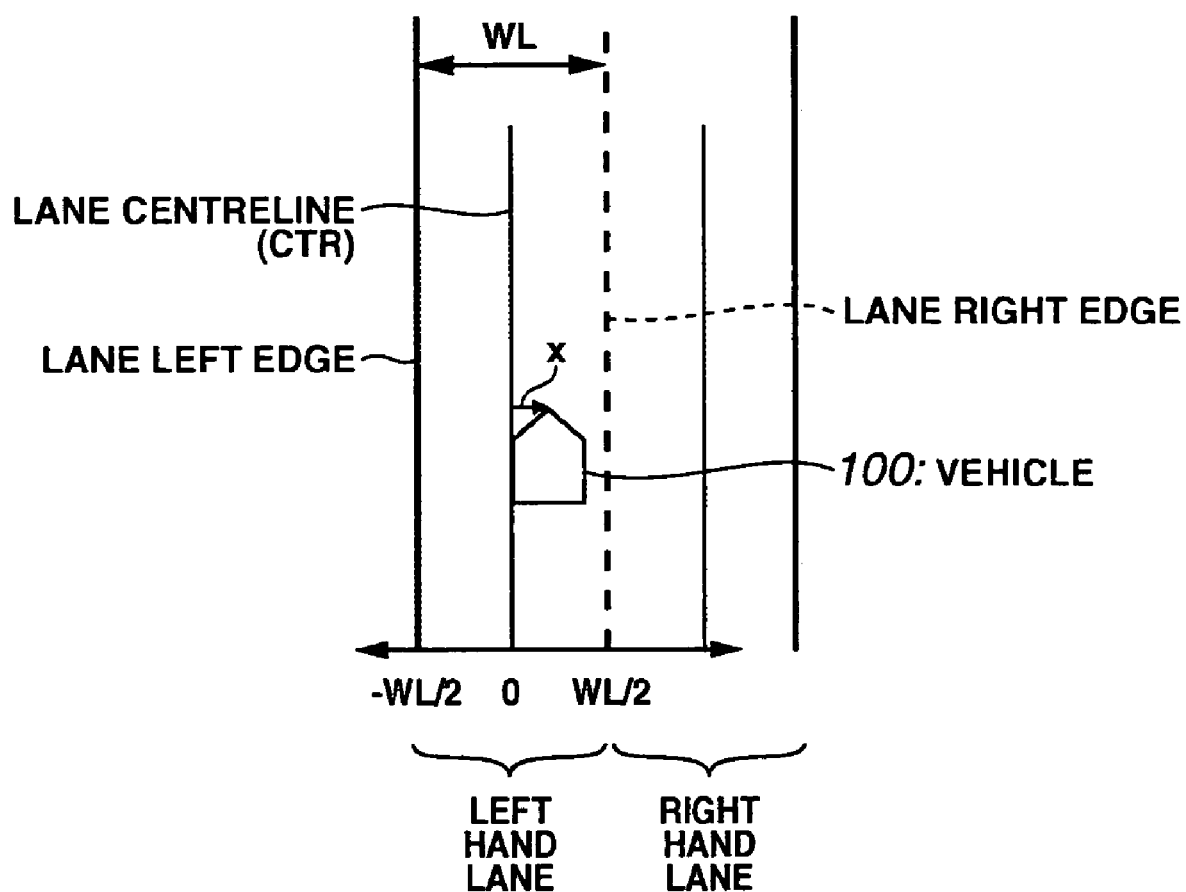
FIG. 6 is a diagram illustrating a lateral position of a vehicle within a lane.

At step S102, a relative positional relationship of the vehicle to the lane boundaries is determined. A lateral position of the vehicle within the lane X is measured by processing the picture image. With reference to FIG. 6, the lateral position X is defined as a distance between a point on a determined lane centerline and a reference point on a longitudinal center line of the vehicle. In the embodiment, the determined lane centerline interconnects middle points of the lane, each of the middle points being within the lane equidistant from the lane boundaries. The lateral position X is 0 (zero) when the reference point lies on the determined centerline. The lateral position X becomes greater than 0 and thus has a plus sign when the reference point falls in a range from the determined lane centerline to the lane boundary on the right. The lateral position X becomes less than 0 (zero) and thus has a minus sign when the reference point falls in a range from the determined centerline to the lane boundary on the left. If the lane has a width WL, the lateral position X is equal to WL/2 when the reference point lies on the lane boundary on the right (X=WL/2), and it is equal to −WL/2 when the reference point lies on the lane boundary on the left (X =−WL/2).

At step S103, angular positions for the right and left side portions 73i and 73j of the seat 71 are calculated based on the lateral position X. In the embodiment, an angular position θR for the right side portion 73i and an angular position θL for the left side portion 73j are calculated. The angular positions θR and θL assume base values of θ0 when the right and left side portions 73i and 73j assume outermost rest positions, respectively, remotest from the driver occupying the seat 71. Increasing the angular positions θR and θL causes inward angular displacements of the right and left side portions 73i and 73 toward the driver, respectively. The angular positions θR and θL assume the maximum values of θmax when the right and left side frames 73b and 73 assume generally upright positions with respect to the seat back frame 73a.

Figure 7:
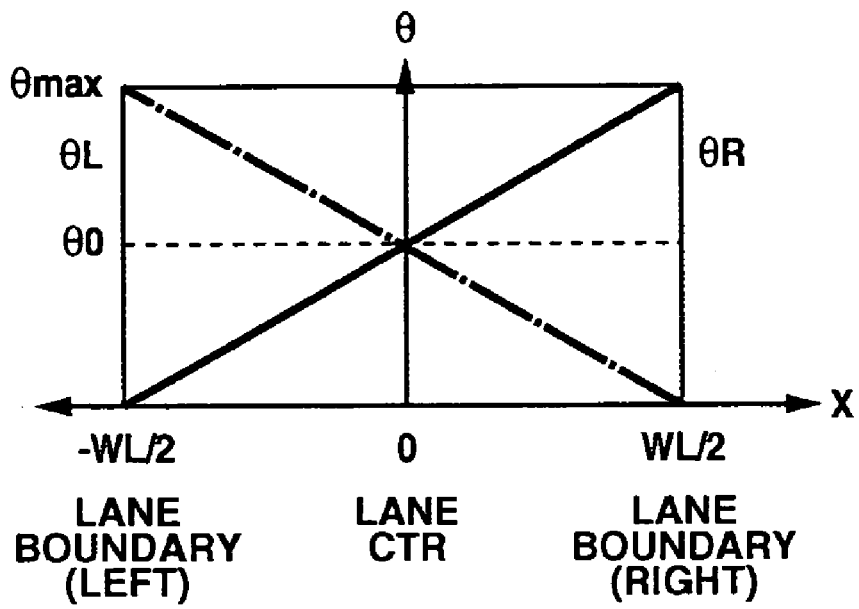
FIG. 7 is a diagram illustrating values of angular positions varying with different lateral position within a lane.

The diagram in FIG. 7 illustrates the relationship between the lateral position X and the angular positionsθL and θR. As the lateral position X is limited within a lane as expressed by −WL/2≦X≦WL/2, the angular positions θR and θL may be expressed as:

$$\theta R = KR0 \cdot X + \theta 0 \tag{1}$$

$$\theta R = KL0 \cdot X + \theta 0 \tag{2}$$

where: KR0=θmax/WL, KL0=−θmax/WL, and θ0=θmax/2.

When the reference point of the vehicle exceeds the lane boundary on the left (X<−WL/2) and the second case when the reference point exceeds the lane boundary on the right (X>WL/2), the angular positions θR and θL are expressed as:

If X<−WL/2, then $$\theta R = 0 \tag{3}$$

$$\theta L = \theta max \tag{4}$$

If X>WL/2, then $$\theta R = \theta max \tag{5}$$

$$\theta L = 0 \tag{6}$$

In FIG. 5, at step S104, the angular positions θR and θL determined at step S103 are translated into motor angle control signals, and the motor angle control signals are provided to the actuator system 70. In response to the motor angle control signals, the motor units 73e and 73f rotate, moving the right and left side frames 73b and 73c to the angular positions θR and θL, respectively.

In FIG. 7, the solid line represents angular position θR and the one-dot chain line represents angular position θL. As shown in FIG. 7, if the reference point of the vehicle lies on the determined centerline (LANE CTR), both of the angular positions θR and θL are equal to θ0, thus producing pressure inputs of the same magnitude from the right and left side portions 73i and 73j. This makes it possible to forward to the driver information that the vehicle is traveling on the determined centerline. If the lateral position X deviates to the right or left from the determined centerline, the angular positions θR and θL changes at the predetermined gradients KR0 and KR0, respectively, causing pressure inputs from the right and left side portions 73i and 73j to change. This technique is effective in preventing the driver from becoming insensitive to haptic input after driving the vehicle on the determined centerline over extended period of time.

If the vehicle is approaching the lane boundary on the right, a pressure input from the right side portion 73i is increased and a pressure input from the left side portion 73j is decreased. When the lateral position X reaches the lane boundary on the right (X=WL/2), the pressure input from the right side portion is increased to the maximum, and the pressure input from the left side portion 73j is decreased to the minimum. When the lateral position X reaches a lane boundary on the left (X=−WL/2), the pressure input from the left side portion 73j is increased and the pressure input from the right side portion 73i is decreased to the minimum.

In this manner, the pressure input from the near side portion to the lane to which the vehicle lies in close proximity is increased, thus forward to the driver information that the vehicle is approaching the lane boundary. Besides, decreasing the pressure input from the remote side portion from the lane boundary increases a difference between both of the pressure inputs, enhancing reliability in transmitting the information to the driver.

The first embodiment provides the following effects.

The controller 50 controls the actuator assembly 70 such that a) a pressure input from the right side portion 73i and a pressure input from the left side portion 73j are substantially the same in magnitude when the lateral position X lies on the determined centerline or at the middle of the lane, and b) if the lateral position X lies in close proximity to a lane boundary, the pressure input from the side portion near the lane boundary is increased and the pressure input from the side portion farther from the lane boundary is decreased. From the preceding descriptions, it is appreciated that the seat 71 forwards to the driver information that the vehicle 100 is traveling on the center zone around the determined centerline via pressure inputs of the generally the same magnitude from the right and left side portions 73i and 73j. It is also appreciated that the seat 71 forwards to the driver information regarding the state of the vehicle in relation to a lane boundary by moving the right and left side portions 73i and 73j in an independent manner. Increasing a pressure input from the side portion near a lane boundary, to which the vehicle lies in close proximity, and decreasing pressure input from the side portion farther from the lane boundary, clearly and reliably transmit to the driver information regarding the lateral position of the vehicle in relation to the lane boundary. Decreasing the input pressure from the remote side portion increases a difference between the two pressure inputs, clarifies the information transmitted to the driver.

Modification to the First Embodiment

Similar to the first embodiment, a seat 71 produces two pressure inputs from its right and left side portions 73i and 73j to transmit information that a vehicle is traveling on a central zone around a determined centerline within a lane, or that the vehicle is approaching a lane boundary of the lane. The modification to the first embodiment varies angular positions θR and θL based on different values of the lateral distance X of the vehicle. This modification will be understood from the diagram in FIG. 8.

Figure 9:
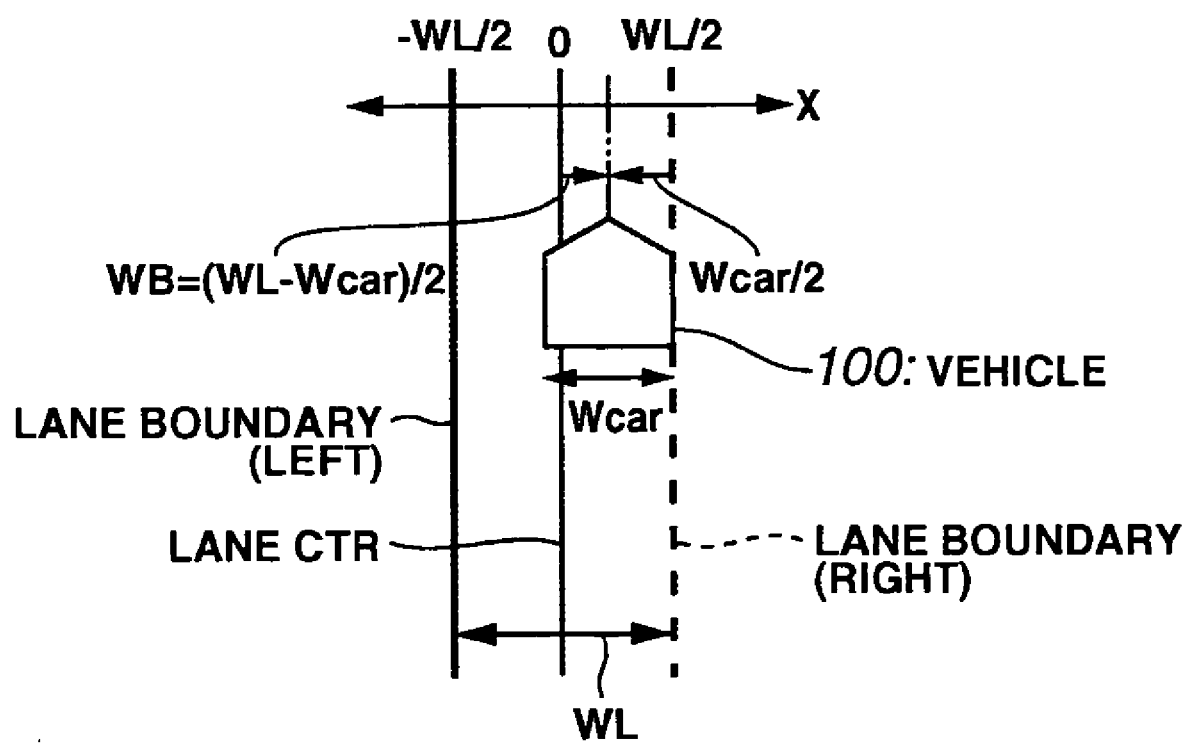
FIG. 9 is a state diagram of a vehicle illustrating the definition of WB.
Figure 10:
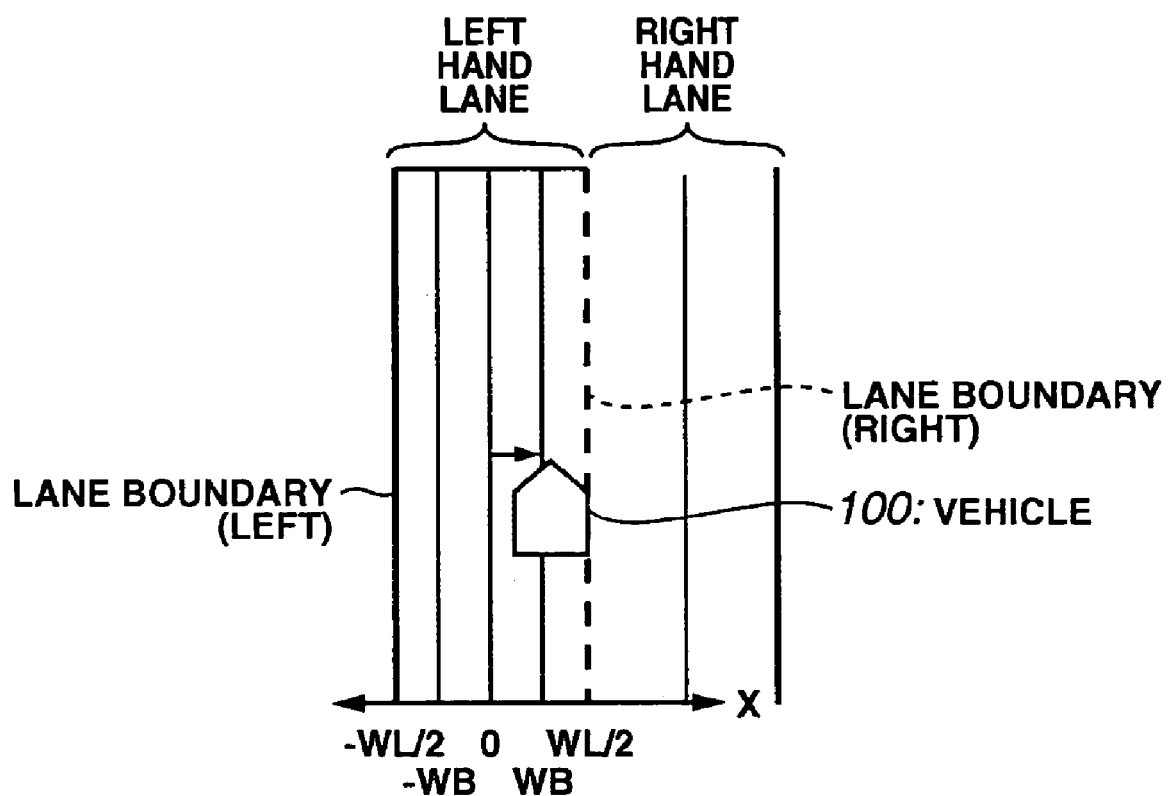
FIG. 10 is a state diagram illustrating a vehicle in close proximity of a lane boundary.

According to this modification, upon determining that a side of a vehicle's body has come to lie above a lane boundary, a pressure input from the farther side portion 73i or 73j of the seat 71 from the lane boundary is decreased to 0 (zero) well before the lateral distance X indicating that the vehicle lies on the lane boundary. With reference to FIGS. 9 and 10, the side of the vehicle body lies above the lane boundary when the lateral position X of the vehicle 100 is equal to a predetermined distance WB. The diagram of FIG. 9 clearly illustrates how the distance WB is determined if a width Wcar of the vehicle 100 is known. The distance WB is given by one half of a difference of WL (width of a lane) and Wcar (width of a vehicle), which can be represented as WB=(WL−Wcar)/2.

Figure 8:
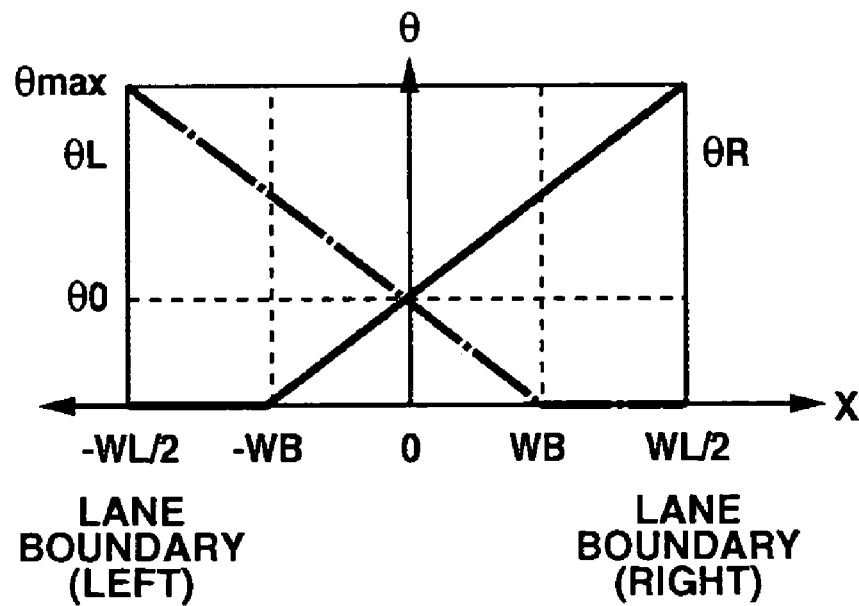
FIG. 8 is a modified diagram similar to FIG. 7.

As shown in FIG. 8, if the vehicle is approaching a lane boundary on the right, the angular position θR continues to increase towards the maximum θmax, but the angular position θL becomes zero when the lateral position X is greater than WB. If the vehicle is approaching the lane boundary on the left, the angular position θL continues to increase towards the maximum θmax, but the angular position θR becomes zero when the lateral position X is less than −WB.

The angular positions θR and θL illustrated in FIG. 8 may be expressed as:

If X<−WL/2, then $$\theta R = 0 \tag{7}$$

$$\theta L = \theta max \tag{8}$$

If X>WL/2, then $$\theta R = \theta max \tag{9}$$

$$\theta L = 0 \tag{10}$$

If −WL/2 ≦ X <−WB, then $$\theta R = 0 \tag{11}$$

$$\theta L = KL0 \cdot X + \theta 0 \tag{12}$$

If −WB ≦ X ≦ WB, then $$\theta R = KR0 \cdot X + \theta 0 \tag{13}$$

$$\theta L = KL0 \cdot X + \theta 0 \tag{14}$$

If WB < X ≦ WL/2, then $$\theta R = KR0 \cdot X + \theta 0 \tag{15}$$

$$\theta L = 0 \tag{16}$$

where: KR0=θmax/(WL/2+WB)

$$KL0 = -\theta max / (WL/2 + WB)$$

$$\theta 0 = \theta max \cdot WB / (WL/2 + WB).$$

From the preceding descriptions, it is understood that a pressure input from the farther side portion of the seat 71 from a lane boundary drops to zero when a side of the vehicle 100 lies over the lane boundary, causing an increase in difference between the two pressure inputs. This increase provides increased clarity and reliability of information to be forwarded to the driver. Further, since gradients KR0 and KL0 are greater than those used in the first embodiment, the change in pressure input per a unit change in lateral position is increased, making it easier for the driver to feel a change in lateral position.

Second Exemplary Embodiment

The second exemplary embodiment is substantially the same as the first exemplary embodiment, but is different from the first embodiment in that, similar to the modification of the first embodiment illustrated in FIGS. 8 and 9, upon determining that a side of a vehicle's body has come to lie above a lane boundary, a difference between two pressure inputs is increased. In the modification of the first embodiment, the difference is increased by decreasing a pressure input from the farther side portion 73i or 73j of the seat 71 from the lane boundary to 0 (zero) well before the lateral distance X comes to lie on the lane boundary. Different from the modification, the second embodiment increases the difference by increasing a pressure input from the near side portion to a lane boundary to the maximum upon determining that a side of a vehicle's body has come to lie above the lane boundary as shown in FIG. 11.

Figure 11:
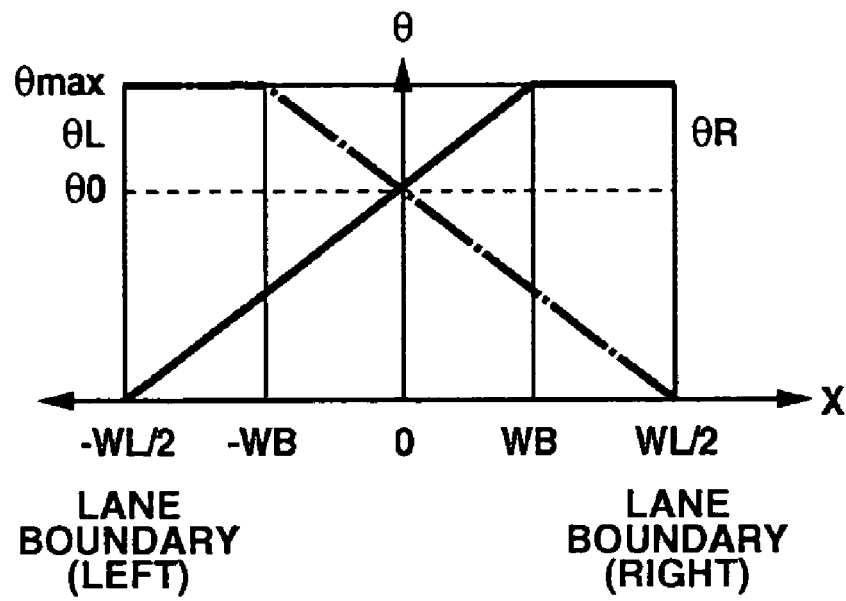
FIG. 11 is a diagram illustrating another embodiment with angular positions varying with different values of a lateral position within a lane.

The angular positions $\theta R$ and $\theta L$ illustrated in FIG. 11 may be expressed as:

If $X < -WL/2$, then $$\theta R = 0 \quad (17)$$

$$\theta L = \theta max \quad (18)$$

If $X > WL/2$, then $$\theta R = \theta max \quad (19)$$

$$\theta L = 0 \quad (20)$$

If $-WL/2 \leq X < -WB$, then $$\theta R = KR0 \cdot X + \theta 0 \quad (21)$$

$$\theta L = \theta max \quad (22)$$

If $-WB \leq X \leq WB$, then $$\theta R = KR0 \cdot X + \theta 0 \quad (23)$$

$$\theta L = KL0 \cdot X + \theta 0 \quad (24)$$

If $WB < X \leq WL/2$, then $$\theta R = \theta max \quad (25)$$

$$\theta L = KL0 \cdot X + \theta 0 \quad (26)$$

where: $KR0 = \theta max/(WL/2 + WB)$ $KL0 = -\theta max/(WL/2 + WB)$ $\theta 0 = \theta max \cdot WB/(WL/2 + WB)/2$.

From the preceding description, it is now understood that according to the second embodiment, a pressure input from the near side portion of the seat 71 to a lane boundary is increased to the maximum when a side of the vehicle 100 comes to lie over the lane boundary, causing an increase in difference between the two pressure inputs. Varying an increase in input pressure from the near side portion with respect to a unit increase in the magnitude of lateral position X makes it easier for the driver to recognize that input pressure is kept at the maximum and that the vehicle has reached the lane boundary.

The pressure input from the farther side portion from the approached lane boundary drops after the pressure input from the near side portion has been kept at the maximum, causing an increase in the difference between the two pressure inputs. This increase in difference makes it easier for the driver to recognize that the vehicle has reached the lane boundary.

In addition to the effects provided by the first embodiment, the second embodiment provides the following effects:

1) The actuator assembly 70 is controlled to vary each of the angular positions $\theta R$ and $\theta L$ based on a change in the lateral position X at two rates as shown in FIG. 11. Using the relationship as illustrated in FIG. 11 makes it easier for the driver to recognize that the vehicle is traveling on the center zone around the determined centerline, that the vehicle is approaching a lane boundary, or that the vehicle's body has come to lie over the lane boundary.

2) As shown in FIG. 11, the angular position of the near side portion to a lane boundary reaches the maximum when the lateral position X exceeds the predetermined value WB. In other words, a pressure input from the near side portion to the lane boundary reaches, and is kept at, the maximum to provide a change in the rate of variation of pressure input with respect to a unit change in lateral position X, which makes it easier for the driver be sense that the body has reached to lane boundary. Decreasing a pressure input from the farther side portion from the approached lane boundary causes an increase in difference, causing the driver to feel relative increase in input pressure from the ear side portion to the lane boundary. This approach makes it unnecessary to increase the pressure input from the near side portion to the lane boundary.

First Modification to the Second Exemplary Embodiment

Figure 12:
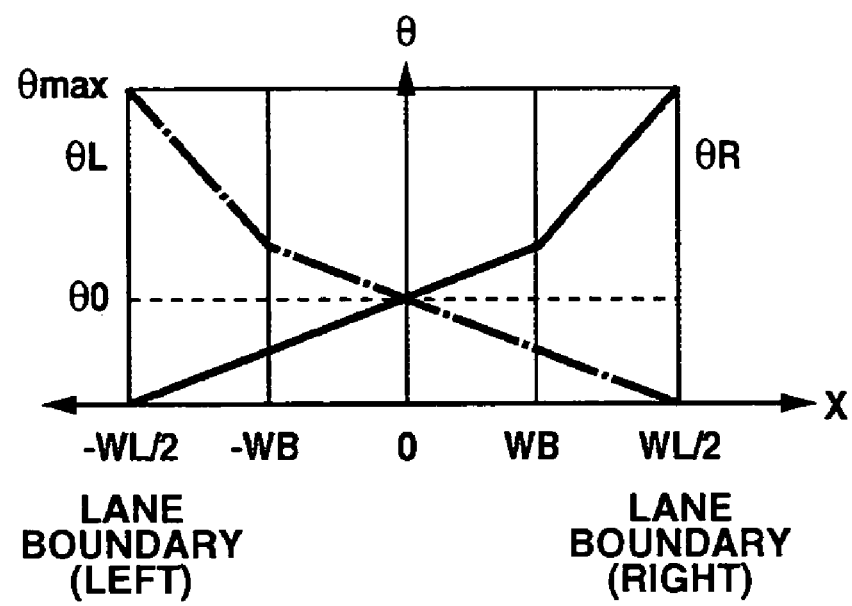
FIG. 12 is a diagram illustrating another embodiment with angular positions varying with different values of a lateral position within a lane.

According to the first modification to the second exemplary embodiment, the angular positions $\theta R$ and $\theta L$ are determined as illustrated in FIG. 12.

The angular positions $\theta R$ and $\theta L$ illustrated in FIG. 12 may be expressed as:

If $X < -WL/2$, then $$\theta R = 0 \quad (27)$$

$$\theta L = \theta max \quad (28)$$

If $X > WL/2$, then $$\theta R = \theta max \quad (29)$$

$$\theta L = 0 \quad (30)$$

If $-WL/2 \leq X < -WB$, then $$\theta R = KR0 \cdot X + \theta 0 \quad (31)$$

$$\theta L = KL1 \cdot X + \theta 1 \quad (32)$$

If $-WB \leq X \leq WB$, then $$\theta R = KR0 \cdot X + \theta 0 \quad (33)$$

$$\theta L = KL0 \cdot X + \theta 0 \quad (34)$$

If $WB < X \leq WL/2$, then $$\theta R = KR1 \cdot X + \theta 1 \quad (35)$$

$$\theta L = KL0 \cdot X + \theta 0 \quad (36)$$

where: gradients KR1 and KL1 should take appropriate values to meet requirements that KR1>KR0, KL1<KL0 (<0).

As is readily seen from FIG. 12, the gradient or the rate of change of pressure input from the near side portion to an approached lane boundary upon and after the vehicle has reached the lane boundary is significant, making it easier for the driver to recognize that the vehicle has reached the lane boundary.

Figure 13:
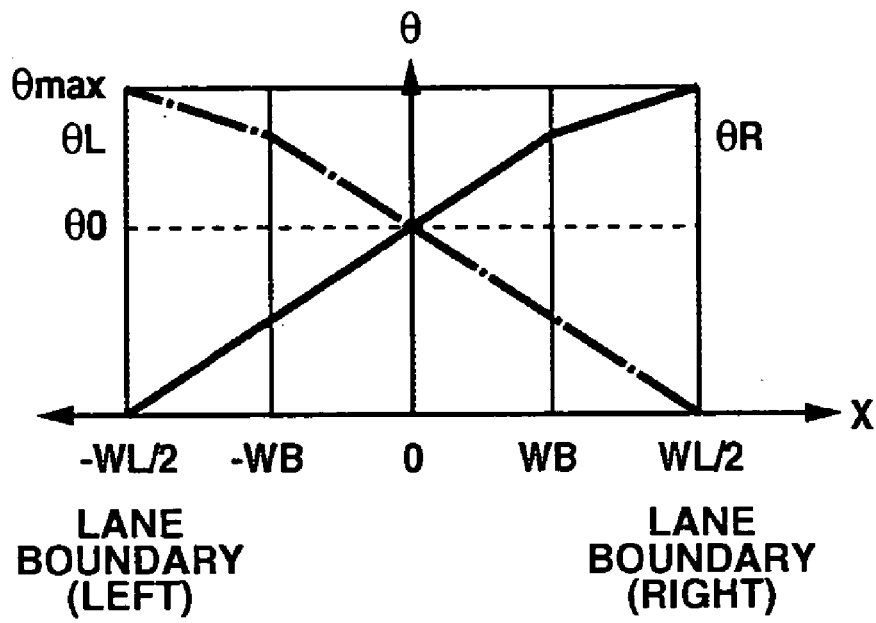
FIG. 13 is a diagram illustrating another embodiment with angular positions varying with different values of a lateral position within a lane.

With reference to FIG. 13, the gradient or the rate of change of pressure input from near side portion to an approached lane boundary may be made less significant. This may be accomplished by:

Setting a gradient KL1 to fall in a range 0>KL1>KL0, if $-WL/2 \leq X < -WB$; and Setting a gradient KR1 to fall in a range 0<KR1<KR0, if $WB<X \leq WL/2$. As is readily seen from FIG. 13, the gradient or the rate of change of pressure input from the near side portion to a lane boundary upon and after the vehicle has reached the lane boundary is less significant. As the magnitude of the pressure input has been increased to a sufficiently high level, providing such less significant gradient doe not affect the driver in recognizing that the vehicle has reached the lane boundary.

Figure 14:
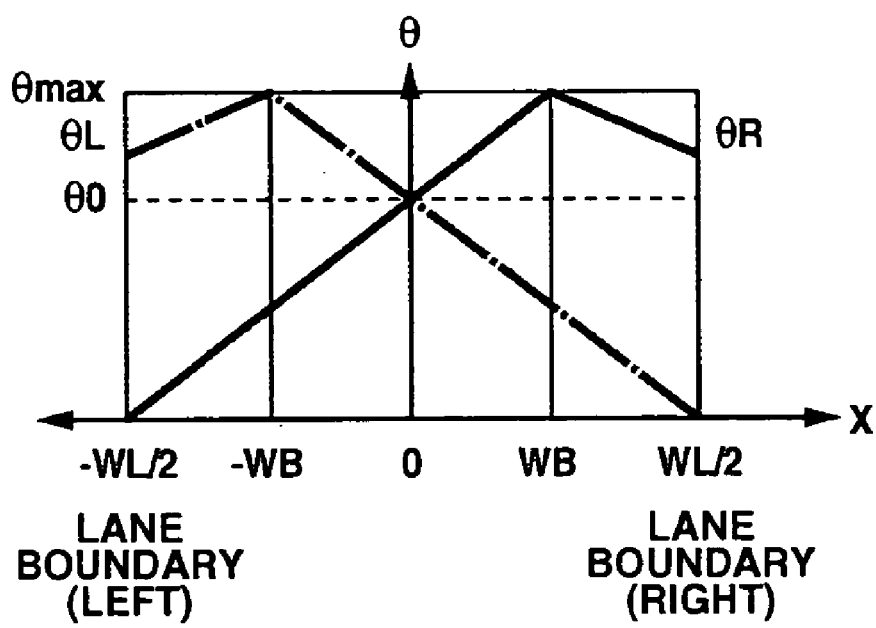
FIG. 14 is a diagram illustrating another embodiment wit angular positions varying with different values of a lateral position within a lane.

As is readily seen from FIG. 14, the gradient of pressure input from the near side portion to a lane boundary may be reversed to have a minus sign upon and after the vehicle has reached the lane boundary. This may be accomplished by:

Setting a gradient KL1 to fall in a range KL1>0, if $-WL/2 \leq X < -WB$; and

Setting a gradient KR1 to fall in a range KR1<0, if $WB<X \leq WL/2$. A slight reduction in pressure input from the near side portion is found to be effective in making it easier for the driver to recognize that the vehicle has reached the lane boundary.

Second Modification to Second Exemplary Embodiment

Figure 15:
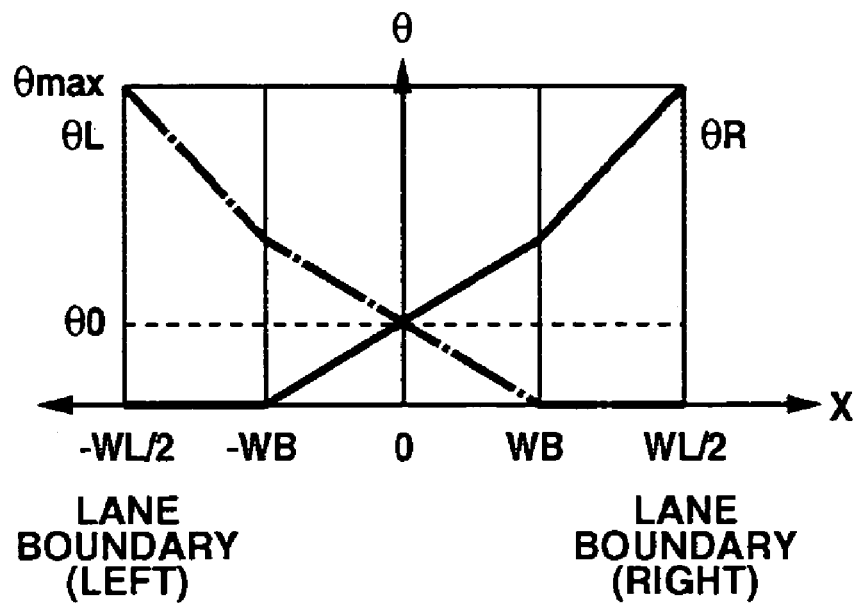
FIG. 15 is a diagram illustrating another embodiment with angular positions varying with different values of a lateral position within a lane.
Figure 16:
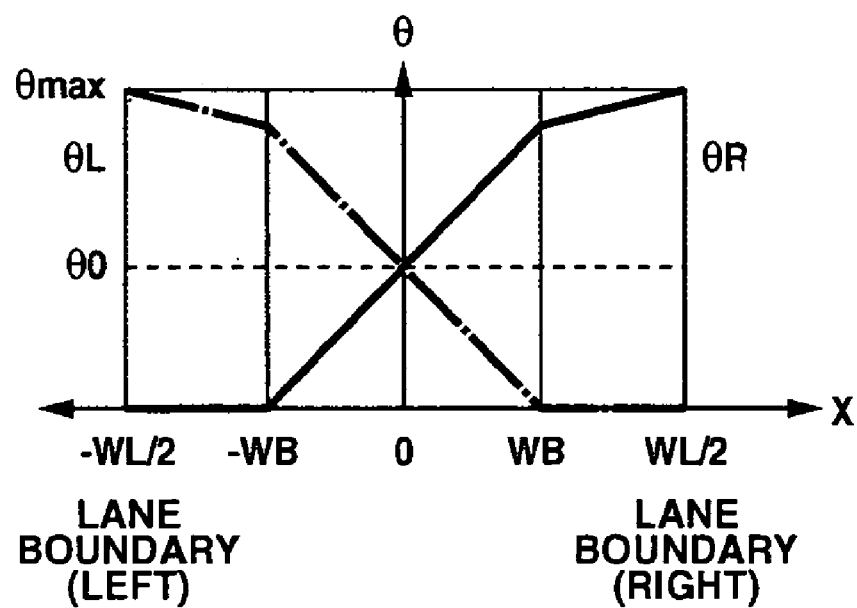
FIG. 16 is a diagram illustrating another embodiment with angular positions varying with different values of a lateral position within a lane.

According to the second modification to the second exemplary embodiment, the angular positions θR and θL are determined as illustrated in FIG. 15. As readily seen from FIG. 5, the angular position from the farther side portion form an approached lane boundary is reduced to the minimum upon and after the vehicle body has reached the lane boundary.

The angular positions θR and θL illustrated in FIG. 15 may be expressed as:

If $-WL/2 \leq X < -WB$, then $$\theta R = 0 \quad (37)$$

$$\theta L = KL1 \cdot X + \theta 1 \quad (38)$$

If $-WB \leq X \leq WB$, then $$\theta R = KR0 \cdot X + \theta 0 \quad (39)$$

$$\theta L = KL0 \cdot X + \theta 0 \quad (40)$$

If $WB < X \leq WL/2$, then $$\theta R = KR1 \cdot X + \theta 1 \quad (41)$$

$$\theta L = 0 \quad (42)$$

where: KR1 and KL1 should take appropriate values to meet requirement that KR1>KR0, KL1<KL0 (<0).

Figure 17:
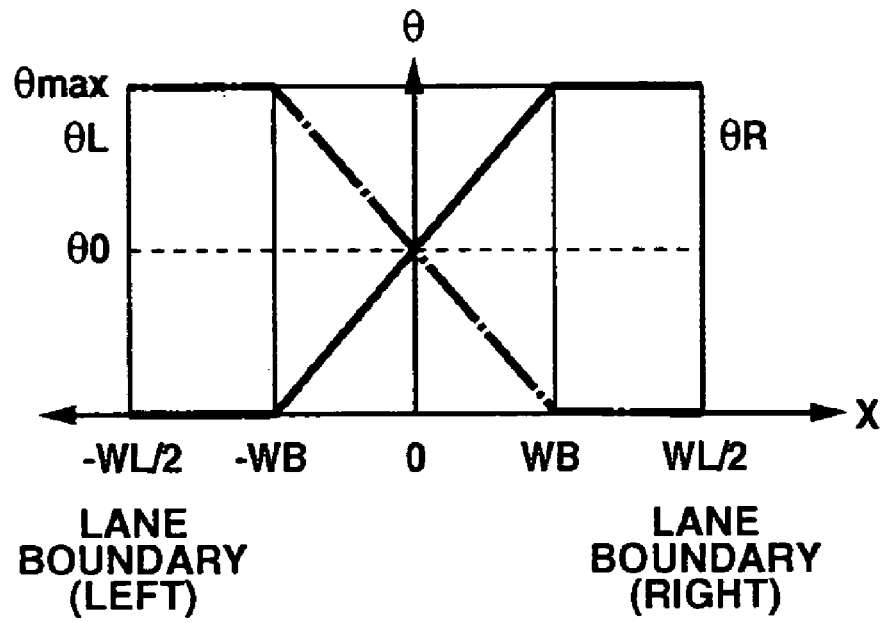
FIG. 17 is a diagram illustrating another embodiment with angular positions varying with different values of a lateral position within a lane.
Figure 18:
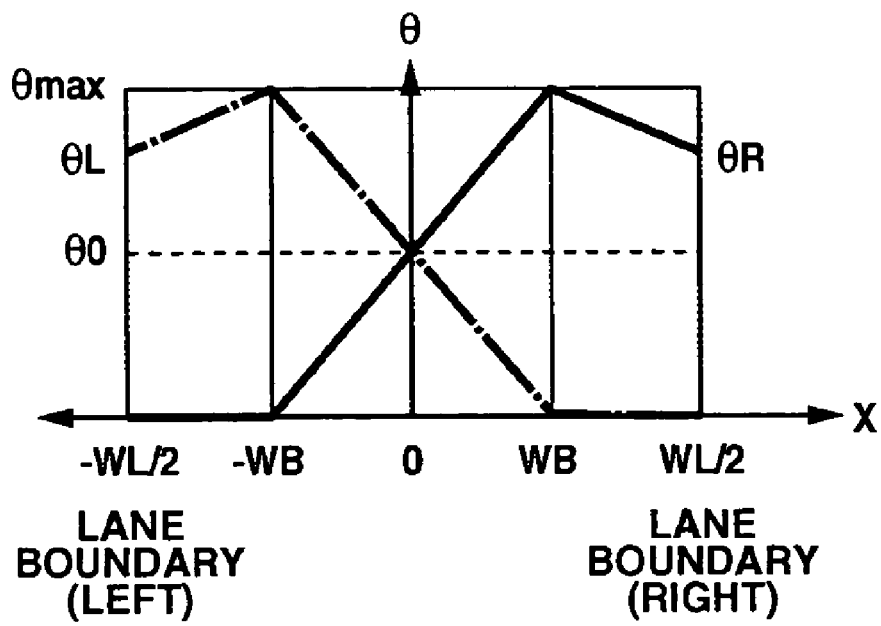
FIG. 18 is a diagram illustrating another embodiment with angular positions varying with different values of a lateral position within a lane.

FIGS. 17 and 18 illustrate additional variations. As readily seen from FIG. 17, a pressure input from the near side portion may be increased to the maximum by setting the angular position of the near side portion to the maximum. This may be accomplished by:

Fixing the angular position θL to the maximum θmax to provide zero gradient, if $-WL/2 \leq X < -WB$; and Fixing the angular position θR to the maximum θmax to provide zero gradient, if $WB < X \leq WL/2$.

Setting a pressure input from the farther side portion to the minimum is found to be effective in making it easier for the driver to recognize that the vehicle has reached the lane boundary.

As readily seen from FIG. 18, the gradient of angular position of the near side portion to an approached lane boundary may be reversed upon and after determination that the vehicle body has reached the lane boundary. This may be accomplished by:

Setting a gradient KL1 to fall in a range KL1>0, if $-WL/2 \leq X < -WB$; and

Setting a gradient KR1 to fall in a range KR1<0, if $WB < X \leq WL/2$.

A slight reduction in pressure input from the near side portion in combination with minimum setting of pressure input from the farther side portion are found to be effective in making it easier for the driver to recognize that the vehicle has reached the lane boundary.

Third Exemplary Embodiment

The third exemplary embodiment is substantially the same as the first and second embodiments. This third embodiment is different from the first and second embodiments in that pressure inputs during a lane change is considered.

Figure 19:
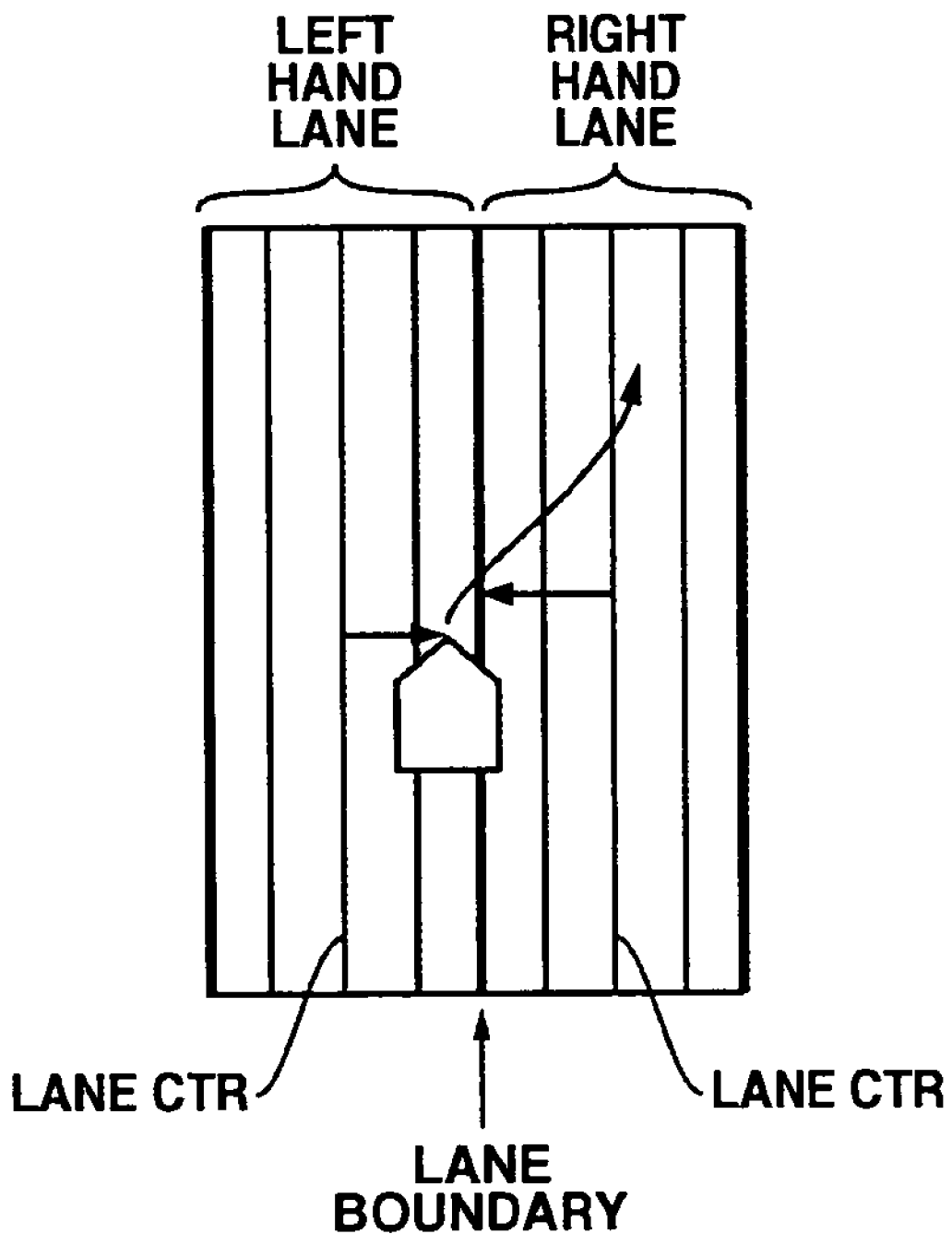
FIG. 19 is a state diagram of a vehicle making a lane change.
Figure 20:
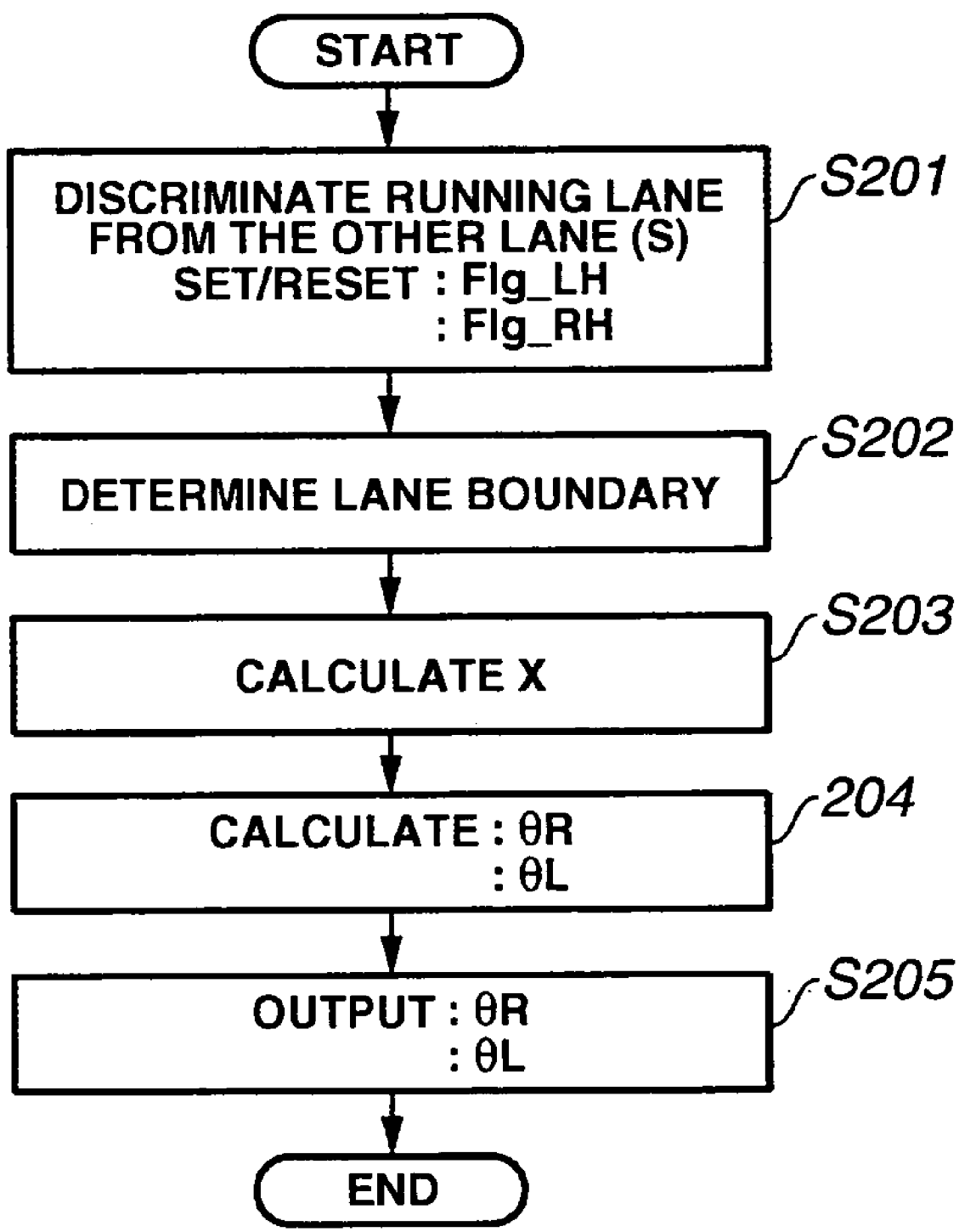
FIG. 20 is a flow chart for carrying out a control process during a lane change.

With reference to FIGS. 19 and 20, the third embodiment is described. FIG. 18 is a state diagram of a vehicle about to carry out a lane change. FIG. 20 is a flow chart of an exemplary control routine to carry out the control process of the third embodiment. The execution of the control routine is repeated at a regular interval of 50 milliseconds.

In FIG. 20, at step S201, a lane on which a vehicle is traveling is determined based on a signal from a navigation system 40. If it is determined that another lane exists on the right to the lane on which the vehicle is traveling, a left lane running flag Flg_LH is reset to Flg_LH=0. If it is determined that another lane does not exist on the right to the lane on which the vehicle is traveling on, the left lane flag Flg_LH is set to Flg_LH=1. If it is determined that another lane exists on the left to the lane on which the vehicle is traveling on, a right lane running flag Flg_RH is set to Flg_RH=0, and if it is determined that another lane doe not exist on the left to the lane on which the vehicle is traveling on, the right lane running flag Flg_RH is set to Flg_RH=1.

At step S202, lane boundaries of the lane on which the vehicle is traveling are determined. Lane markings defining lane boundaries of the lane are recognized by processing a picture image, picked up by the front camera 20, of a road ahead of the vehicle.

At step S203, a lateral position X of the vehicle within the lane is measured by processing the picture image. In this embodiment, the lateral position X is defined as a distance between a point on a determined lane centerline and a reference point on a longitudinal center line of the vehicle. In the embodiment, the determined lane centerline interconnects the middle points of the lane, each of the middle points being within the lane equidistant from the lane boundaries. If another lane exists, a lateral distance X relative to a determined centerline of another lane is determined upon or immediately after the center of the vehicle has exceeded the lane boundary between the two lanes.

Figure 21:
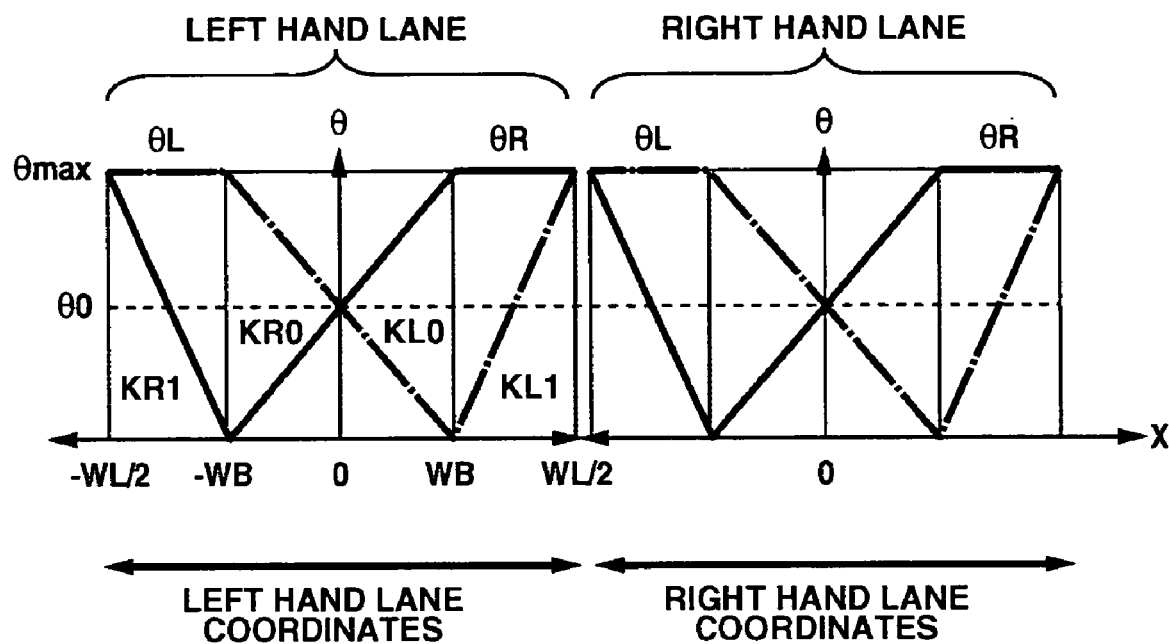
FIG. 21 is a diagram illustrating another embodiment with angular positions varying with different values of a lateral position over two lanes.

At step S204, based on the states of the flags Flg_LH and Flg_RH and the lateral position X, angular positions θR and θL are calculated. FIG. 21 illustrates the relationship between angular positions θR and θL and the lateral position X.

The angular positions θR and θL as illustrated in FIG. 21 may be expressed as:

If X<−WL/2, and the right lane flag Flg_RH=1 (another lane does not exist on the left), then $$\theta R = \theta max \quad (43)$$

$$\theta L = \theta max \quad (44)$$

If X>WL/2, and the left lane flag Flg_LH=1 (another lane does not exist on the right), then $$\theta R = \theta max \quad (45)$$

$$\theta L = \theta max \quad (46)$$

If −WL/2≦X<−WB, then $$\theta R = KR0 \cdot X + \theta 0 \quad (47)$$

$$\theta L = \theta max \quad (48)$$

If −WB≦X≦WB, then $$\theta R = KR0 \cdot X + \theta 0 \quad (49)$$

$$\theta L = KL0 \cdot X + \theta 0 \quad (50)$$

If WB<X≦WL/2, then $$\theta R = \theta max \quad (51)$$

$$\theta L = KL1 \cdot X + \theta 1 \quad (52)$$

where: KR0=θmax/(2·WB), KL0=−θmax/(2·WB), θ0=θmax/2, KR1=−θmax/(WL/2−WB), KL1=θmax/(WL/2−WB), θ1=−θmax/(WL/2−WB)·WB.

At step S205, the angular positions θR and θL determined at step S204 are translated into motor angle control signals, and the motor angle control signals are provided to the actuator system 70. In response to the motor angle control signals, the motor units 73e and 73f rotate to move the right and left side frames 73b and 73c to the angular positions θR and θL, respectively.

With reference to FIG. 21, during a lane change to another lane on the right, upon or immediately after the right side of the vehicle 100 has come to lie over a lane boundary on the right, a pressure input from a right side portion 73i is kept at the maximum and a pressure input from a left side portion 73j is increased towards the maximum. Subsequently, upon the reference point or center of the vehicle has come to lie on the lane boundary on the right, both the pressure inputs from the side portions 73i and 73j have reached the maximum. Immediately after the reference point of the vehicle has entered another lane with the pressure input from the left side portion 73j kept at the maximum, the pressure input from right side portion 73 is reduced gradually. In this manner, pressure inputs from the right and left side portions 73i and 73j are uninterruptedly produced during lane change.

In addition to the effects provided by the first and second embodiments, the third embodiment provides the following effects:

As mentioned above, during a lane change, pressure inputs from right and left side portions are varied until they are equal to each other, and then one of them are reduced gradually to fit a situation when the vehicle is within another lane. In this embodiment, both pressure inputs become the maximum upon crossing a lane boundary, making it possible for the driver to recognize the moment of crossing the lane boundary.

Modification 1 to Third Exemplary Embodiment

Figure 22:
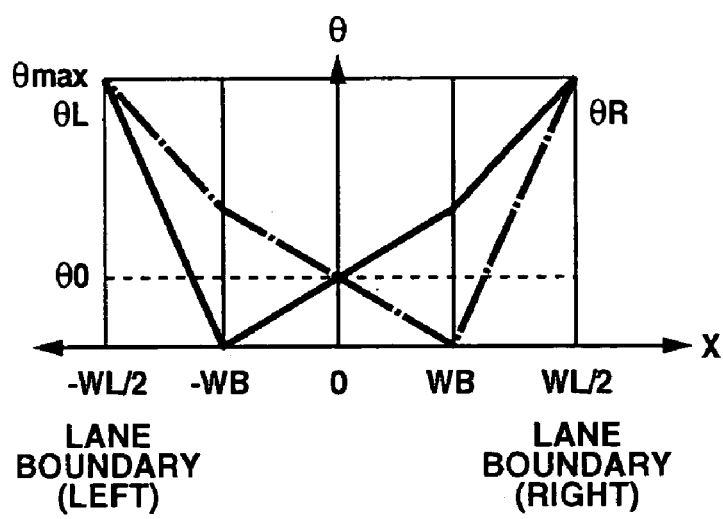
FIG. 22 is a diagram illustrating another embodiment with angular positions varying with different values of a lateral position within a lane.

According to the first modification, angular positions θR and θL are varied as illustrated in FIG. 22. This modification is intended to shorten the time during which one of the pressure inputs is kept at the maximum during a lane change.

The angular positions θR and θL as illustrated in FIG. 22 may be expressed as

If −WL/2≦X<−WB, then $$\theta R = KR1 \cdot X + \theta 1 \quad (53)$$

$$\theta L = KL2 \cdot X + \theta 2 \quad (54)$$

If −WB≦X≦WB, then $$\theta R = KR0 \cdot X + \theta 0 \quad (55)$$

$$\theta L = KL0 \cdot X + \theta 0 \quad (56)$$

If WB<X≦WL/2, then $$\theta R = KR2 \cdot X + \theta 2 \quad (57)$$

$$\theta L = KL1 \cdot X + \theta 1 \quad (58)$$

where: KR2>KR0, KL2<KL0 (<0).

Upon or immediately after the lateral position X exceeds WB (or−WB), the pressure input from the near side portion starts increasing at an increased rate, and the pressure input from the remote side portion starts increasing, thus making it easier for the driver to perceive that the vehicle has begun crossing the lane boundary and continue to receive continuous variation of the pressure inputs during the lane change.

Figure 23:
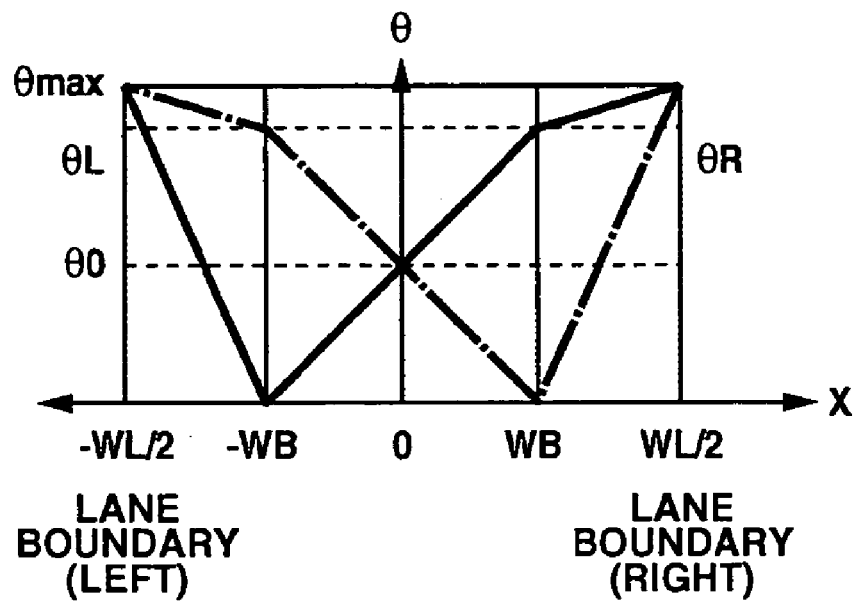
FIG. 23 is a diagram illustrating another embodiment with angular positions varying with different values of a lateral position within a lane.
Figure 24:
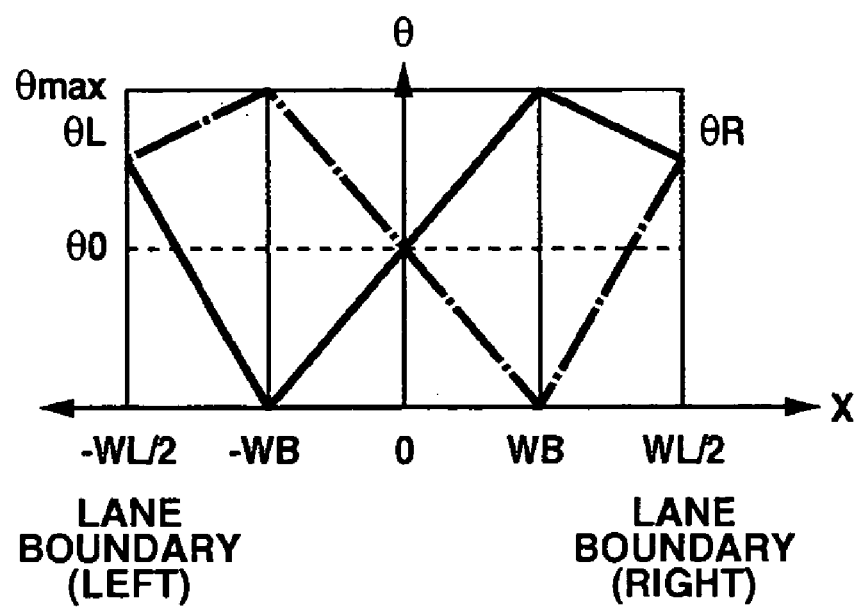
FIG. 24 is a diagram illustrating another embodiment with angular positions varying with different values of a lateral position within a lane.

FIGS. 23 and 24 illustrate additional variations. As readily seen from FIG. 23, a pressure input from the near side portion may be increased at a less rate towards the maximum.

This may be accomplished by:

Setting gradient KL2 for the angular position θL to fall in a range 0>KL2 >KL0, if −WL/2≦X<−WB; and Setting gradient KR2 for the angular position θR to fall in a range 0<KR2<KR0, if WB<X≦WL/2.

As readily seen from FIG. 24, a gradient of varying the angular position of the near side portion to an approached lane boundary may be reversed upon and after determination that the vehicle body has reached the lane boundary.

This is accomplished by the following settings:

Setting a gradient KL2 for the angular position θL to fall in a range KL2>0, if −WL/2≦X<−WB; and Setting a gradient KR2 for the angular position θR to fall in a range KR2<0, if WB<X≦WL/2.

Modification 2 to Third Exemplary Embodiment

Figure 25A:
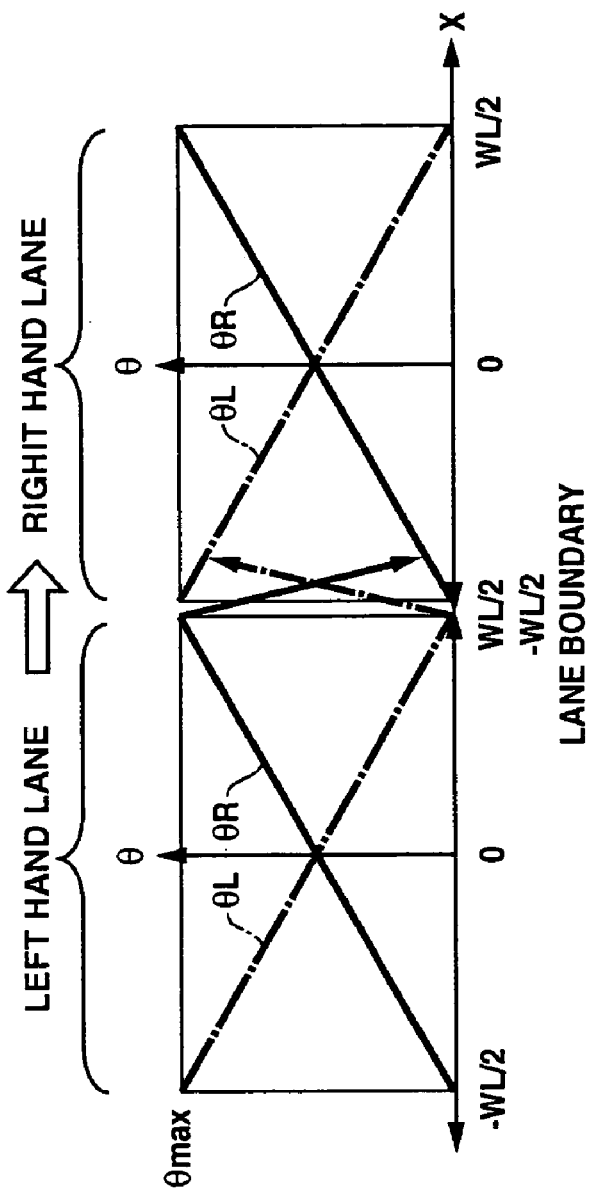
FIG. 25(a) is a diagram illustrating another embodiment with angular positions varying with different values of a lateral position over two lanes.
Figure 25B:
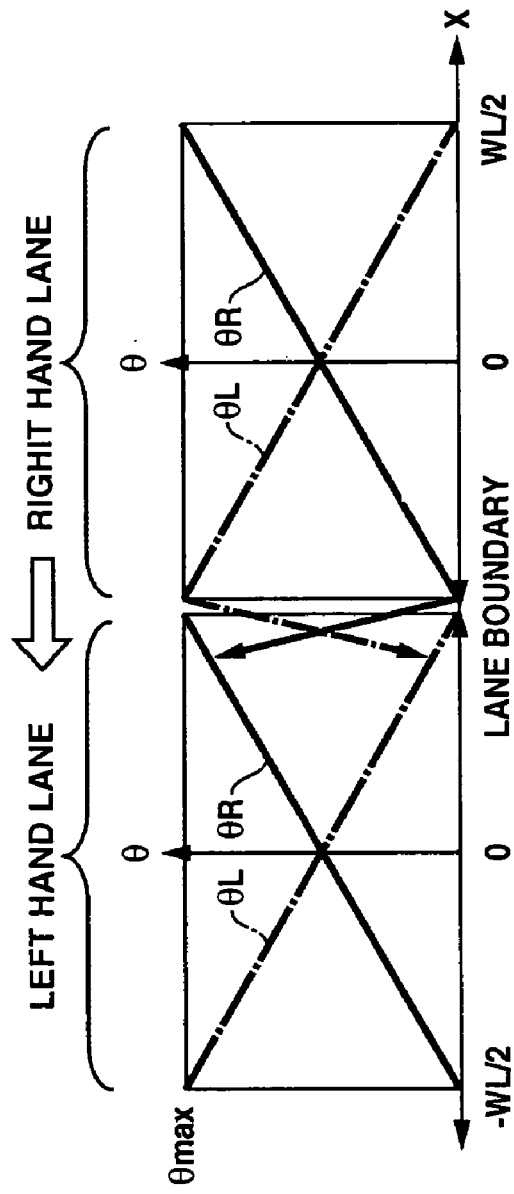
FIG. 25(b) is a diagram illustrating another embodiment with angular positions varying with different values of a lateral position over two lanes.

According to the second modification, angular positions θR and θL are varied as illustrated in FIGS. 25(a) and 25(b).

Figure 26:
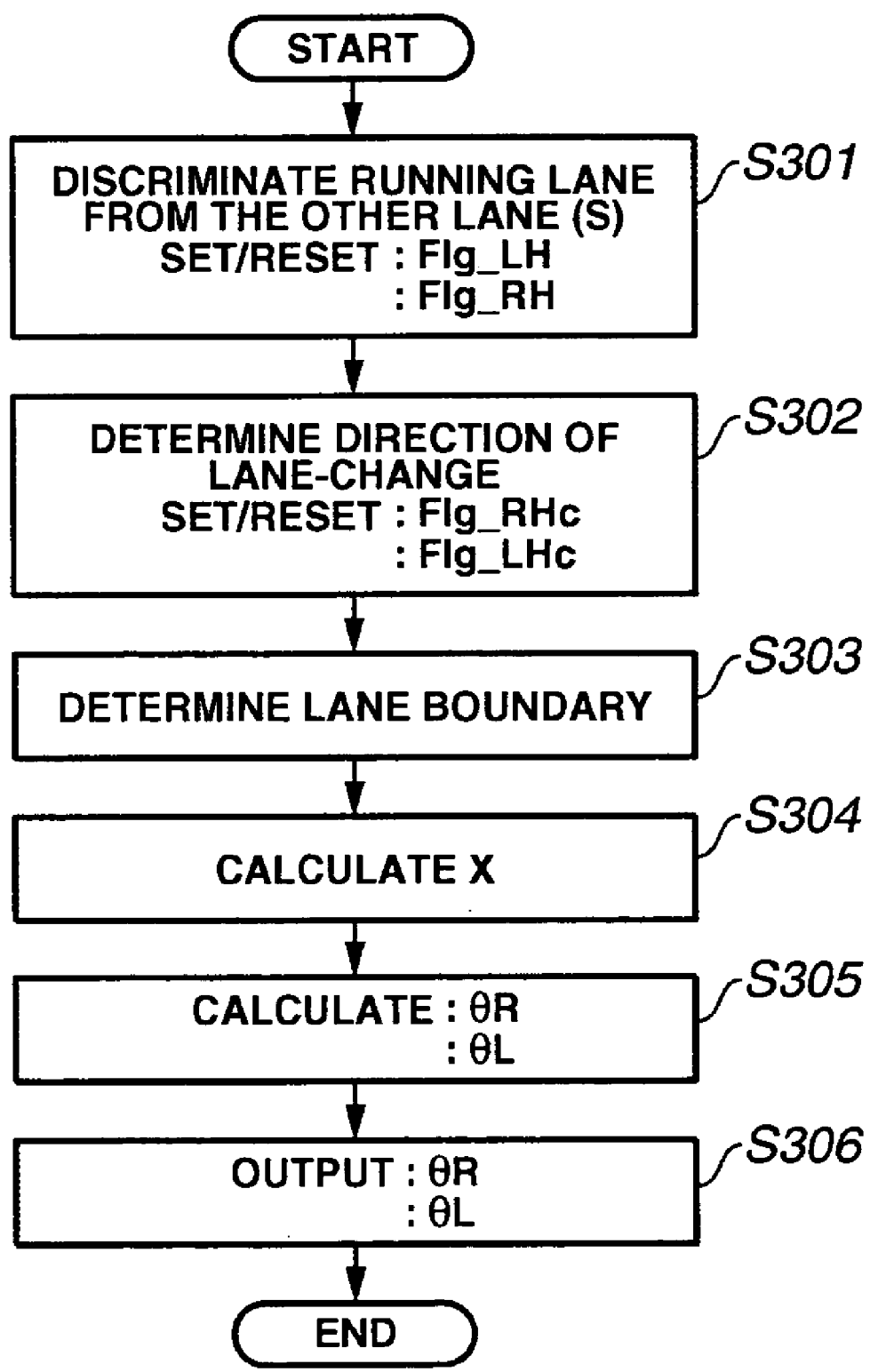
FIG. 26 is a flow chart for carrying out a control process during a lane change.

FIG. 26 is a flow chart of an exemplary control routine to carry out the control process of the second modification. The execution of the control routine is repeated at a regular interval of 50 milliseconds.

In FIG. 26, at step S301, a lane on which a vehicle is traveling is determined based on a signal from a navigation system 40. If it is determined that another lane exists on the right to the lane on which the vehicle is traveling, a left lane running flag Flg_LH is set as Flg_LH=0. If it is determined that another lane does not exist on the right to the lane on which the vehicle is traveling, the left lane Flg_LH is set as Flg_LH=1. If it is determined that another lane exists on the left to the lane on which the vehicle is traveling, a right lane running flag Flg_RH is set as 0, and if it is determined that another lane doe not exist on the left to the lane on which the vehicle is traveling, the right lane running flag Flg_RH is set as 1.

At step 302, based on the states of the flags Flg_LH and Flg_RH, and history of the lateral position X, a direction of lane change is determined.

If the left lane running flag Flg_LH=0 and it is determined that a direction of lane change is from a left lane to a right lane, a change-to-right lane change flag Flg_LHc is set, Flg_Lhc=1.

If the right lane running flag Flag_RH=0, and it is determined that a direction of lane change is from the right lane to the left lane, a change-to-left lane change flag Flag_RHc is set, Flag_RHc=1.

If the left lane running flag Flg_LH is set (Flg_LH=1) or there is no intention to change lane to the lane on the right, the change-to-right lane change flag Flg_LHc is reset, Flg_LHc=0.

If the right lane running flag Flag_RH is set (Flg_RH=1) or there is no intention to change lane to the lane on the left, the change-to-left lane change flag Flg_RHc is reset, Flg_RHc=0.

At step S303, lane boundaries of the lane that the vehicle is traveling on are determined. Lane markings defining lane boundaries of the lane are recognized by processing a picture image, picked up by the front camera 20, of a road ahead of the vehicle.

At step S304, a lateral position X of the vehicle within the lane is measured by processing the picture image. In this embodiment, the lateral position X is defined as a distance between a point on a determined lane centerline and a reference point on a longitudinal center line of the vehicle. In the embodiment, the determined lane centerline interconnects middle points of the lane, each of the middle points being within the lane equidistant from the lane boundaries. If another lane exists, a lateral distance X relative to the determined center line of approached lane is calculated from a determined centerline of another lane upon or immediately after the center of the vehicle has exceeded a lane boundary.

At step S305, based on the states of the flags Flg_LH, Flg_RH, Flg_LHc and Flg_RHc and the lateral position X, angular positions θR and θL are calculated.

If X <−WL/2, and the right lane flag Flg_RH=1 (another lane does not exist on the left), then $$\theta R = 0 \quad (59)$$

$$\theta L = \theta max \quad (60)$$

If X>WL/2, and the left lane running flag Flg_LH=1 (another lane does not exist on the right), then $$\theta R = \theta max \quad (61)$$

$$\theta L = 0x \quad (62)$$

If −WL/2 ≦ X ≦ WL/2

$$\theta R = KR0 \cdot X + \theta 0 \quad (63)$$

$$\theta L = KL0 \cdot X + \theta 0 \quad (64)$$

where: KR0=θmax/WL, KL0 =−θmax/WL, θ0=θmax/2.

Figure 27A:
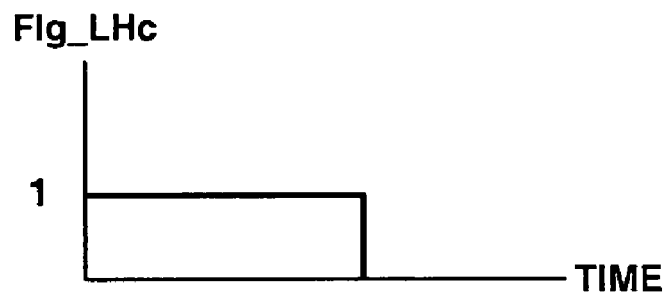
FIGS. 27(a) to 27(c) are signal timing diagrams of a first lane-changing scenario.
Figure 27B:
Figure 27C:
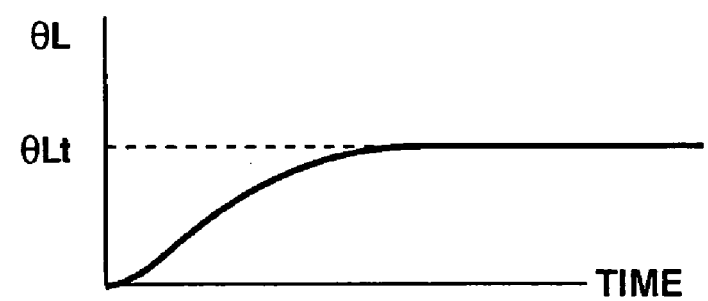

If the lane change flag Flg_LHc=1 or Flg_RHc=1, the angular position θR and θL are gradually varied in a time-dependent manner towards desired values after a lane change. For example, as shown in FIG. 27(b), the angular position θR is varied in a time-dependent manner towards a desired value θRt that has been set for a lateral position X with respect to a new lane after the lane change. As shown in FIG. 27(c), the angular position θL is varied in a time-dependent manner towards a desired value θLt that has been set for the lateral position X with respect to the new lane. If the desired values θRt and θLt are reached, the lane change flag Flg_LHc is reset.

Figure 28A:
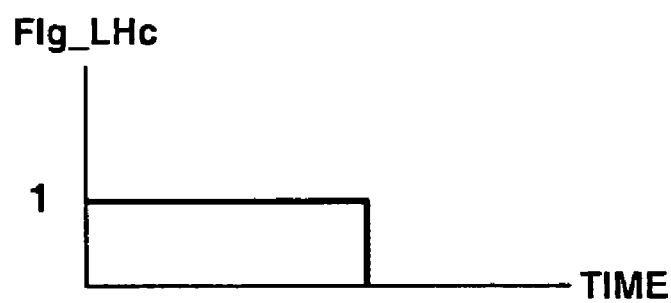
FIGS. 28(a) to 28(c) are signal timing diagrams of a second lane-changing scenario.
Figure 28B:
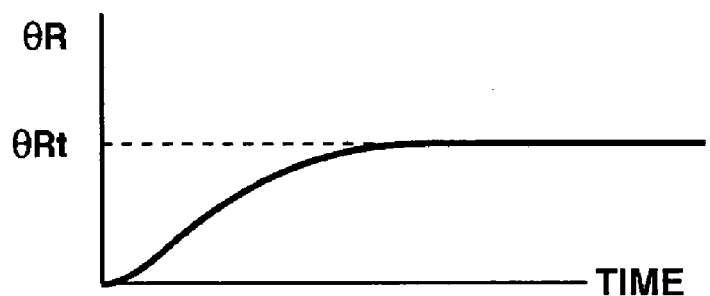
Figure 28C:
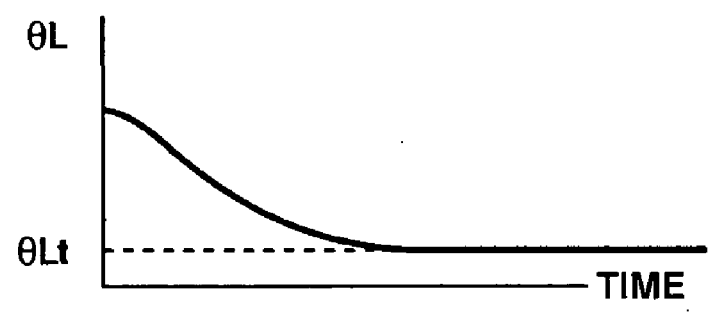

For a lane change to the lane on the right, as shown in FIG. 28(b), the angular position θR is varied in a time-dependent manner towards a desired value θRt that has been set for a lateral position X with respect to a new lane after the lane change. As shown in FIG. 28(c), the angular position θL is varied in a time-dependent manner towards a desired value θLt that has been set for the lateral position X with respect to the new lane. If the desired values θRt and θLt are reached, the lane change flag Flg_RHc is reset.

A controller 50 controls varying of the θR and θL towards θRt and θLt using, for example, a first order delay filter.

At step S306, the angular positions θR and θL determined at step S305 are translated into motor angle control signals, and the motor angle control signals are provided to the actuator system 70. In response to the motor angle control signals, the motor units 73e and 73f rotate, moving the right and left side frames 73b and 73c to the angular positions θR and θL, respectively.

With reference to FIG. 25(a), upon or immediately after the lateral position X exceeding the lane boundary on the right, the angular positions θR and θL start changing gradually to desired values θRt and θLt suitable for the new lane.

With reference to FIG. 25(b), upon or immediately after the lateral position X exceeding the lane boundary on the left, the angular positions θR and θL start changing gradually to desired values θRt and θLt suitable for the new lane.

During a lane change, the gradual changes of angular positions θR and θL are gradually to target values make it possible to provide smooth shift in pressure inputs.

In the preceding description, the side portions 72i, 73i and 72j, 73j of the seat 71 are all rotated inwardly to apply pressure to the driver. The present disclosure is not limited to the illustrated example of rotating the side portions of the seat. Another example is rotating the side portion 72i and 72j of the cushion portion 72 or the side portions 73i and 73j of the back rest 73. Further example is to rotate the side portions 72i and 72j of the cushion portion 72 if the potential risk, RP, is low, and rotate all of the side portions 72i, 73i, 72j and 73j if the potential risk, RP, is high.

The illustrated actuator assembly 70 is one of various embodiments. Other embodiments may include, for example, an air bag may be used to modify contour of the seat 71. In this case, pressure within the air bag is regulated in accordance with the potential risk, RP. In embodiments, a potential risk, RP, has been used to generate the information to be forwarded to the driver via haptic input(s). The information is not limited to such potential risk, RP. Any desired form of information regarding a lateral position X or lane boundaries may be created and transmitted to the driver via haptic input.

Although the disclosure has been shown and described with respect to the exemplary implementations, it is obvious that equivalent alterations and modifications will occur to those skilled in the art upon reading and understanding of the specification. The present disclosure includes all such equivalent alterations and modifications, and is limited only by the scope of the claims.

What is claimed is:

1. A system for providing driving condition information to a driver of a vehicle occupying a driver seat having a first portion and a second portion, the system comprising:
   a sensor for sensing a driving condition; and
   a controlling device configured to regulate at least one of
      a first haptic signal applied to the driver from the first portion of the seat and a second haptic signal applied to the driver from the second portion of the seat, based on the driving condition;

wherein responsive to the driving condition representing that the vehicle is traveling about a determined centerline of a lane on which the vehicle is being driven, the first haptic signal and the second haptic signal are substantially equal.

2. The system of claim 1, wherein responsive to the driving condition representing that the vehicle is deviating from the determined centerline, the controlling device is configured to regulate at least one of the first haptic signal and the second haptic signal such that a difference between the first haptic signal and the second haptic signal exceeds a predetermined value.

3. The system of claim 1, wherein the first portion of the seat corresponds to a first boundary of the lane, and the second portion of the seat corresponds to a second boundary of the lane.

4. The system of claim 3, wherein responsive to the driving condition representing that the vehicle is deviating from the determined centerline towards one of a first boundary and a second boundary of the lane, the controlling device varies the corresponding one of the first haptic signal and the second haptic signal, in which the selected haptic signal is varied at more than one rate with respect to a lateral position of the vehicle relative to the determined centerline.

5. The system of claim 3, wherein responsive to the driving condition representing that the vehicle deviates from the determined centerline towards the first boundary beyond a predetermined range, the controlling device causes the second haptic signal to assume a minimum value.

6. The system of claim 3, wherein responsive to the driving condition representing that the vehicle deviates from the determined centerline towards the first boundary beyond a predetermined range, the controlling device causes the first haptic signal and second haptic signal to assume a maximum value.

7. The system of claim 3, wherein responsive to the driving condition representing that the vehicle deviates from the determined centerline towards the first boundary beyond a predetermined range, the controlling device sets a change rate of the first haptic signal to assume a maximum value.

8. The system of claim 3, wherein responsive to the driving condition representing that the vehicle deviates from the determined centerline towards the first boundary beyond a predetermined range, the controlling device sets a change rate of the second haptic signal to assume a minimum value.

9. The system of claim 3, wherein responsive to the driving condition representing that the vehicle deviates from the determined centerline towards the first boundary beyond a predetermined range, the controlling device decreases the first haptic signal.

10. The system of claim 3, wherein responsive to the driving condition representing that the vehicle deviates from the determined centerline towards the first boundary beyond a predetermined range, the controlling device increases the second haptic signal.

11. The system of claim 2, wherein responsive to the driving condition representing that the vehicle has changed to a new lane, the controlling device controls the first haptic signal and the second haptic signal to gradually assume values corresponding to the new lane.

12. A vehicle comprising:
a seat configured to be occupied by a driver operating the vehicle;
a sensor for sensing a driving condition; and
a controlling device configured to regulate at least one of a first haptic signal applied to the driver from a first portion of the seat and a second haptic signal applied to the driver from a second portion of the seat, based on the driving condition;

wherein responsive to the driving condition representing that the vehicle is traveling about a determined centerline of a lane on which the vehicle is being driven, the first haptic signal and the second haptic signal are substantially equal.

13. A method for providing driving condition information to a driver of a vehicle occupying a driver seat having a first portion and a second portion, the method comprising the steps of:
generating a driving condition signal representing a driving condition of the vehicle; and
regulating at least one of a first haptic signal applied to the driver from the first portion of the seat and a second haptic signal applied to the driver from the second portion of the seat, based on the driving condition;
wherein responsive to the driving condition representing that the vehicle is traveling about a determined centerline of the lane on which the vehicle is being driven, the first haptic signal and the second haptic signal are substantially equal.

14. The method of claim 13, wherein responsive to the driving condition representing that the vehicle is deviating from the determined centerline relative to the determined centerline, regulating at least one of the first haptic signal and the second haptic signal such that a difference between the first haptic signal and the second haptic signal exceeds a predetermined value.

15. A system for providing driving condition information to a driver of a vehicle occupying a driver seat having a first portion and a second portion, the system comprising:
means for generating a driving condition signal representing a driving condition of the vehicle; and
means for regulating at least one of a first haptic signal applied to the driver from the first portion of the seat and a second haptic signal applied to the driver from the second portion of the seat, based on the driving condition;
wherein responsive to the driving condition representing that the vehicle is traveling about a determined centerline of the lane on which the vehicle is being driven, the first haptic signal and the second haptic signal are substantially equal.

16. A system for providing driving condition information to a driver of a vehicle occupying a driver seat having a first portion and a second portion, the system comprising:
a sensor for obtaining a driving condition of the vehicle; and
a controlling device configured to perform the steps of:
determining that the vehicle is being driven on a first lane based on the obtained driving condition;
based on the driving condition, determining an event that the vehicle is crossing or has crossed a lane boundary between the first lane and a second lane next to the first lane;
responsive to the event, determining a positional relationship of the vehicle relative to the second lane; and
providing a haptic signal to the driver from the seat based on the positional relationship of the vehicle relative to the second lane.

17. The system of claim 16, wherein the haptic signal includes a first haptic signal to the driver from a first portion of the seat and a second haptic signal to the driver from a second portion of the seat.

18. The system of claim 17, wherein the first haptic signal and the second haptic signal are substantially equal immediately before the vehicle is crossing the lane boundary between the first lane and the second lane.

19. The system of claim 17, wherein the controlling device is further configured to perform the steps of:
   determining a centerline of the first lane;
   determining a position of the vehicle relative to the centerline of the first lane; and
   responsive to the position of the vehicle deviating from the centerline of the first lane, regulating the first haptic signal and the second haptic signal such that a difference between the first haptic signal and the second haptic signal exceeds a predetermined value.

20. The system of claim 17, wherein the controlling device is further configured to perform the following steps in response to the event:
   determining a centerline of the second lane;
   determining the position of the vehicle relative to the centerline of the second lane; and
   regulating the first haptic signal and the second haptic signal based on the position of the vehicle relative to the centerline of the second lane.

21. A method for providing driving condition information to a driver of a vehicle occupying a driver seat having a first portion and a second portion, the method comprising the steps:
   obtaining a driving condition of the vehicle;
   determining that the vehicle is being driven on a first lane based on the obtained driving condition;
   based on the driving condition, determining an event that the vehicle is crossing or has crossed a lane boundary between the first lane and a second lane next to the first lane;
   responsive to the event, determining a lateral positional relationship of the vehicle relative to the first lane; and
   providing a haptic signal to the driver from the seat based on the lateral positional relationship of the vehicle relative to the second lane.

22. A vehicle comprising:
   a seat configured to be occupied by a driver operating the vehicle;
   a sensor for obtaining a driving condition of the vehicle; and
   a controlling device configured to perform the steps of:
   determining that the vehicle is being driven on a first lane based on the obtained driving condition;
   based on the driving condition, determining an event that the vehicle is crossing or has crossed a lane boundary between the first lane and a second lane next to the first lane;
   responsive to the event, determining a positional relationship of the vehicle relative to the second lane; and
   providing a haptic signal to the driver from the seat based on the positional relationship of the vehicle relative to the second lane.

* * * * *